United States Patent [19]
Ingalsbe et al.

[11] Patent Number: 5,907,606
[45] Date of Patent: May 25, 1999

[54] TELEPHONE-LINE POWERED COIN TELEPHONE CHASSIS

[75] Inventors: David L. Ingalsbe, Paynesville; Michael A. Lynch, Wilmar, both of Minn.

[73] Assignee: Independent Technologies, Inc., Omaha, Nebr.

[21] Appl. No.: 08/785,354

[22] Filed: Jan. 17, 1997

Related U.S. Application Data

[60] Provisional application No. 60/010,112, Jan. 17, 1996.
[51] Int. Cl.$^6$ .................................................. H04M 17/00
[52] U.S. Cl. .......................... 379/146; 379/143; 379/145; 379/152
[58] Field of Search ........................ 379/106–107, 379/145–155, 143, 1, 188–189, 29, 27, 106.1, 32, 34

[56] References Cited

U.S. PATENT DOCUMENTS

| | | | |
|---|---|---|---|
| 4,926,458 | 5/1990 | Reger et al. | 379/155 |
| 4,989,239 | 1/1991 | McGarry | 379/146 |
| 5,311,582 | 5/1994 | Davenport et al. | 379/155 |
| 5,345,495 | 9/1994 | Black et al. | 379/29 |
| 5,410,590 | 4/1995 | Blood et al. | 379/147 |

*Primary Examiner*—Curtis A. Kuntz
*Assistant Examiner*—Duc Nguyen
*Attorney, Agent, or Firm*—Skinner and Associates

[57] ABSTRACT

A telephone-line powered coin telephone chassis which operates on as little as 23 milliamperes of off-hook loop current and which shuts down on-hook. Capacitors power a microprocessor for a short time during on-hook coin control immediately after a phone call. The chassis is designed to operate with the WESROC® coin telephone monitoring system and has built-in circuitry which makes a direct communications link between a remote unit of the WESROC system and the chassis. Connectors are built into the chassis for electrically connecting the chassis to the WESROC remote unit and to coin telephone components external to the chassis. Built into the chassis is circuitry for preventing tone fraud and pin fraud, detecting the presence of the handset, a push-button line diagnostic test, an interface for a volume switch and an interface for an electronic coin chute.

1 Claim, 28 Drawing Sheets

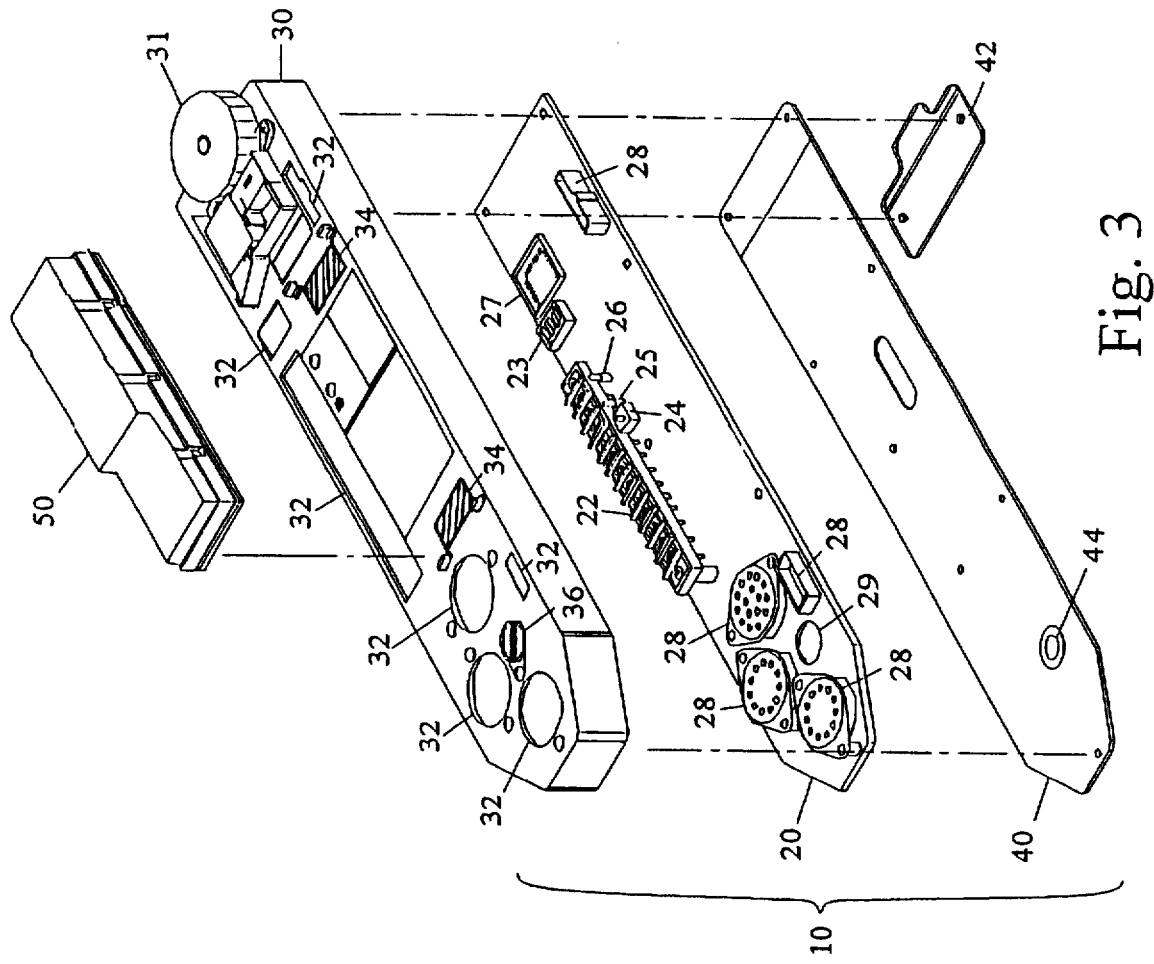
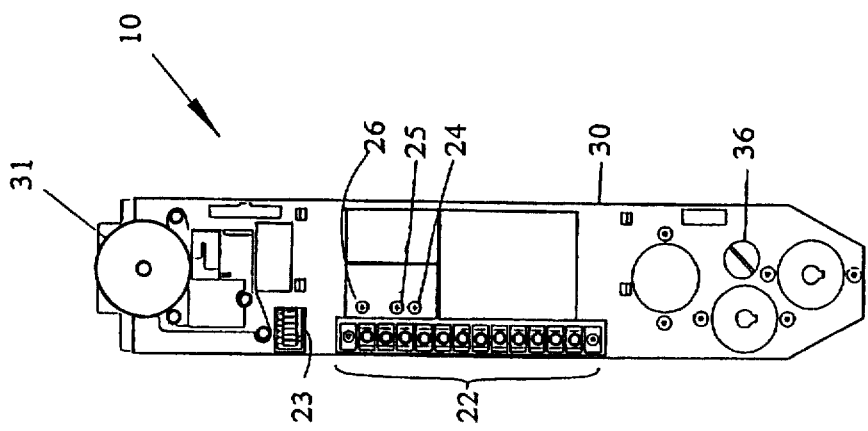
Fig. 3
Fig. 2

FIG. 7 SCH

FIG. 5 SCH

TELEPHONE-LINE POWERED COIN TELEPHONE CHASSIS

CROSS-REFERENCE TO RELATED APPLICATIONS, IF ANY

This application claims the benefit of 35 U.S.C 119 (e), of U.S. provisional application Ser. No. 60/010112, filed Jan. 17, 1996 pending.

STATEMENT REGARDING FEDERALLY SPONSORED RESEARCH OR DEVELOPMENT

Not applicable.

REFERENCE TO A MICROFICHE APPENDIX, IF ANY Not Applicable.

BACKGROUND OF THE INVENTION

1. Field of the Invention

This invention relates, generally, to telecommunications apparatus, and more particularly to a chassis for use in a coin or pay telephone.

2. Background Information

The state of the art includes various coin telephones. Some are owned and controlled by a telephone company, while others are customer owned and do not rely on signaling from a central office. Many prior art coin telephones require an independent power supply at the site of the telephone. Some sites where it may be desirable to locate a coin telephone may not have such a power supply readily accessible. The expense of providing access to such a power supply may prohibit use of such a telephone.

The prior art also includes line powered coin telephones which can obtain some of the necessary operating power from the telephone line itself. The telephone line provides at least 23 milliamperes of loop current to the telephone during the off-hook condition. During the on-hook condition, however, line loop current is limited by law to a maximum of five microamperes. Phones which require devices to be energized during on-hook condition require an additional power source, typically a battery. An example of such a system in a coin operated customer owned line powered telephone is disclosed in U.S. Pat. No. 5,133,005 to Kelley et al. Because it is customer owned, the Kelley telephone must have the ability within the telephone to rate calls, control coin collection, and connect calls rather than relying on a signal from a central office. The Kelley telephone shuts down unnecessary circuits during the on-hook condition, but has a real time clock, memory, and wake-up circuitry which must be kept energized during on-hook condition. A rechargeable battery supplies that power. The battery is charged by any excess current available from the telephone line during off-hook condition. If there is an excessively long period where the telephone remains in the on-hook condition, the battery may discharge to a low enough level to make the telephone inoperative.

Another example of a line powered telephone which uses a rechargeable battery is disclosed in U.S. Pat. No. 4,759,054 to Mellon. The Mellon phone is powered by line power in both the on-hook and off-hook condition, but it is connected to a coin trunk. Current to energize the coin collect relay is generally provided by the central office in the off-hook condition, but the phone has a battery to supply current for the coin collect in situations where the central office current is not available to operate the coin collect relay.

The owner of a coin telephone has a need to monitor its use and status to know for example, the total coins in a coin box and when repair is needed. Efficient collection routes can be designed by knowing such data. Statistical data regarding the amount of usage of a coin telephone and types of calls made from it is also useful. One such electronic system which does that is the WESROC® coin phone monitoring system. WESROC is a multipurpose monitoring system for coin telephones manufactured by Independent Technologies, Inc. of Omaha, Nebr., applicant's assignee. The WESROC apparatus and method are described in U.S. Pat. No. 5,410,590, entitled Monitoring System for Remote Devices, which was issued Apr. 25, 1995, to Blood et al. U.S. Pat. No. 5,410,590 is hereby incorporated by reference. Prior art coin telephones do not have built in capability to work with a state of the art monitoring system such as WESROC.

Public coin telephones are also subject to vandalism, and attempted fraudulent use. If a handset is shorted out, pin fraud is possible and line current can significantly increase, which could damage other components. Prior art coin telephones do not have built in capability to detect and prevent tone and pin fraud.

Accordingly, it is an object of the invention to provide a coin telephone chassis which does not need any power source other than that which is available through the telephone line. It is further object of the invention to provide a coin telephone chassis having a built-in interface for a multipurpose monitoring system for coin telephones such as WESROC. It is another object of this invention to provide a coin telephone chassis with built-in features for the WESROC monitoring system. It is another object of the invention to provide a coin telephone chassis having built-in devices to prevent tone and pin fraud.

Applicant's invention provides a coin telephone chassis which overcomes the limitations and shortcomings of prior art coin telephones.

BRIEF SUMMARY OF THE INVENTION

The present invention provides a line powered coin telephone chassis which operates on as little as 23 milliamperes of loop current provided by a central office through the tip and ring conductors of the telephone line in response to an off-hook condition at the telephone being sensed by the central office. The chassis comprises electronic circuitry, a microprocessor, electrical connections to components of the telephone external to the chassis, and electrical connections to a remote unit of a coin telephone monitoring system. The electronic circuitry operates only on the loop current provided to control the operation and functions of the telephone while said telephone is in an off-hook condition. When the telephone goes to an on-hook condition, the electronic circuitry shuts down.

During off-hook condition, the microprocessor receives input signals from portions of the electronic circuitry and provides outputs to portions of the electronic circuitry. A plurality of capacitors store necessary energy and provide necessary voltage to keep the microprocessor powered during coin control operation immediately following a phone call when the telephone goes on-hook and loop current is not available. The capacitors keep the microprocessor powered for up to 10 seconds. A voltage detector shuts down the microprocessor when the voltage from the capacitors drops below 2.7 volts to prevent a software latch up which may occur if the microprocessor operates at too low a voltage.

The chassis is designed to work with the WESROC monitoring system. A portion of the circuitry detects whether or not a handset is connected to the telephone. If the handset is not connected, a signal is sent to the WESROC system where a notation is made to repair the telephone. A portion of the electronic circuitry makes a direct communications link between a remote unit of the WESROC system and the chassis.

Built in to the chassis circuitry are portions for providing tone fraud protection, pin fraud protection, a push-button line diagnostic test, DTMF priority, an interface for a volume switch and an interface for an electronic coin chute. Tone fraud protection is provided by removing the 2200 Hz signal from the handset microphone transmission during selectable times when coin tones should be generated. Pin fraud protection is provided by using an isolated power supply for the handset microphone so that if the handset microphone is shorted to ground, no tip to ground current can flow. The push-button line diagnostic test has two LED's which indicate proper polarity of the telephone line connections and a proper ground connection. Because all of these features are built into the chassis circuitry rather than added on, the chassis can operate properly on only 23 milliamperes of loop current. Such low current requirements allow this chassis to operate on longer telephone line loops without the need for range extenders.

The features, benefits and objects of this invention will become clear to those skilled in the art by reference to the following description, claims and drawings.

BRIEF DESCRIPTION OF THE SEVERAL VIEWS OF THE DRAWING

FIG. 2 is a front view of an assembled coin telephone chassis of the present invention.

FIG. 3 is a partially exploded perspective view of the chassis to show its components.

DETAILED DESCRIPTION

1. Structure

Figure 1:
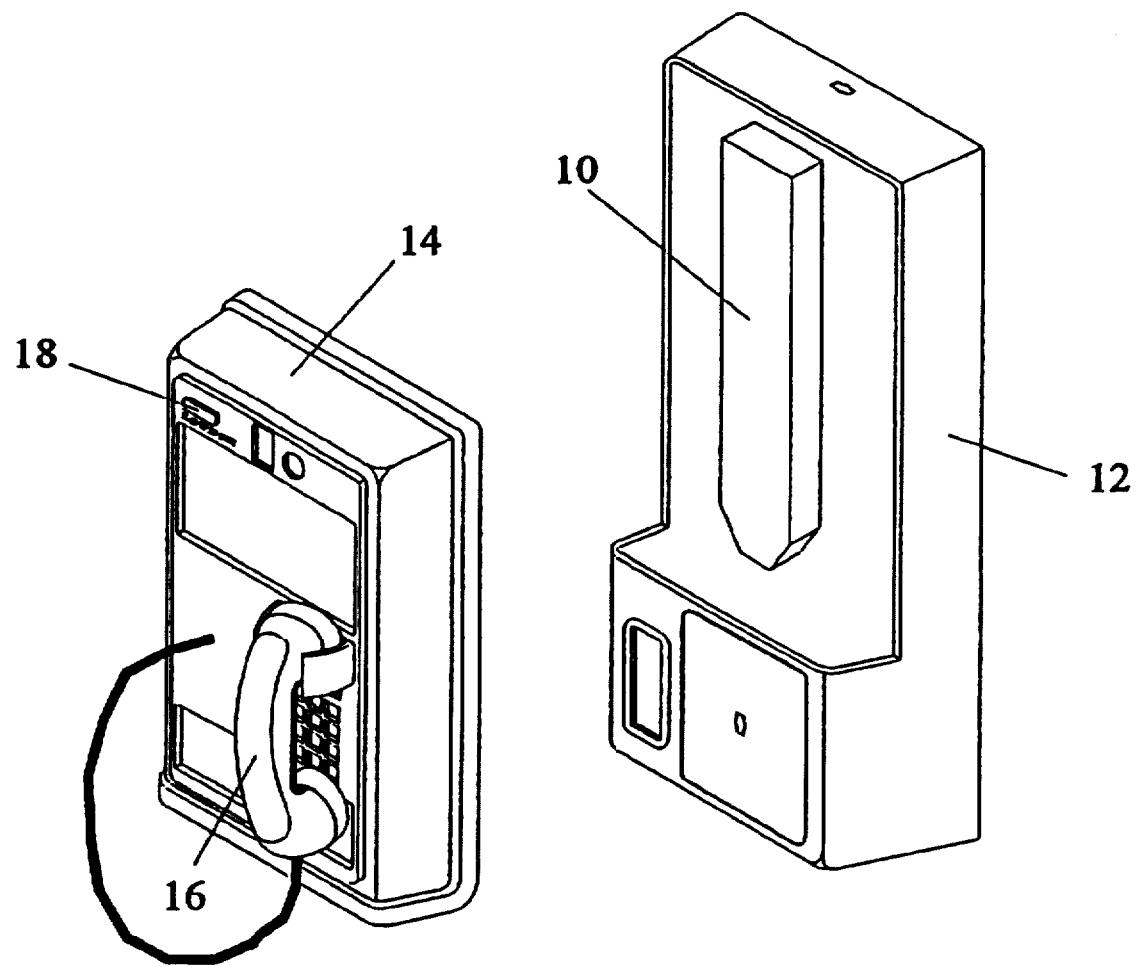
FIG. 1 is a partially exploded perspective view of a coin telephone with a chassis of the present invention installed.

Referring to FIG. 1, the telephone-line powered coin telephone chassis 10 of the present invention is attached to a coin telephone 12. Head assembly 14 with handset 16 and volume switch 18 attaches to coin phone 12 to enclose chassis 10. The embodiment of chassis 10 described herein functions with Northern Telecom type coin telephones and is a replacement for the Northern Telecom telephone chassis. The teachings of this invention and the electronic circuitry are applicable to AT&T and GTE telephone chassis as well.

The telephone industry standard for minimum current available from a telephone line is 23 milliamperes. This chassis operates properly at that current and can work at slightly lower currents. This allows operation on longer loop circuits without the need for loop extenders. All interfaces have electrostatic discharge protection and are digitally buffered.

Referring to FIGS. 2 and 3, the chassis 10 generally comprises a circuit board 20, a front cover 30, a back cover 40 and a bracket 42. Circuit board 20 holds all the electrical components of chassis 10 except for ringing device 31 which is attached to front cover 30. Components shown on circuit board 20 include a terminal block 22 for connecting wires including those for the phone line and handset, the initial rate selection dip switches 23, a push-to-test button 24, LED's 25 and 26 for testing the phone line, microprocessor 27, and several electrical connectors 28 for components external to chassis 30. The remaining space on circuit board 20 is filled with electronic components (not shown) which comprise the circuitry described herein. The circuitry includes four sections: a main section (FIGS. 4A–4D), an interface section (FIGS. 5A–5D), an analog section (FIGS. 6A–6D), and a digital section (FIGS. 7A–7D).

Besides holding ringing device 31, front cover 30 has several cut-outs 32 for components on circuit board 20 (terminal block 22, initial rate selection dip switches 23, push-to-test button 24, LED's 25 and 26, and electrical connectors 28) to protrude through cover 30 so those components can be accessed from outside of front cover 30. Attached to front cover 30 are hook and loop fastener parts 34 which mate with corresponding parts on the remote unit 50 of a coin telephone monitoring system, thereby securing remote unit 50 to chassis 10. The remote unit 50 shown is for the WESROC coin telephone monitoring system. While other coin telephone monitoring systems may work with a chassis of the present invention, the chassis embodiment described herein is best suited for use with the WESROC system.

Back cover 40 attaches to front cover 30 to enclose circuit board 20. Bracket 42 attaches to assembled front cover 30 and back cover 40. Bracket 42 slides into a slot (not shown) on coin phone 12 (FIG. 1), and, with chassis mounting screw 36, secures the chassis 10 to coin phone 12. Chassis mounting screw 36 is attached to front cover 30 and extends through hole 29 in circuit board 20 and hole 44 in back cover 40 to threadably engage coin phone 12.

2. Main Section Circuitry

Referring to FIGS. 4A–4D, This main section contains the interconnections to the interface, analog and digital sections of the chassis and the interface connections to the external components used in a coin telephone. The circuit also contains connections for the coin relay, coin chute, hood, a remote interface for the WESROC monitoring system, an MS-16 type interface for the coin chute, and a rear test connection. This section also contains much of the surge protection and electrostatic discharge circuitry of the chassis. Where an asterisk appears before an input or output label, it means that the signal is normally high and goes low when activated, whereas other signals are normally low and go high when activated.

Figure 4A:
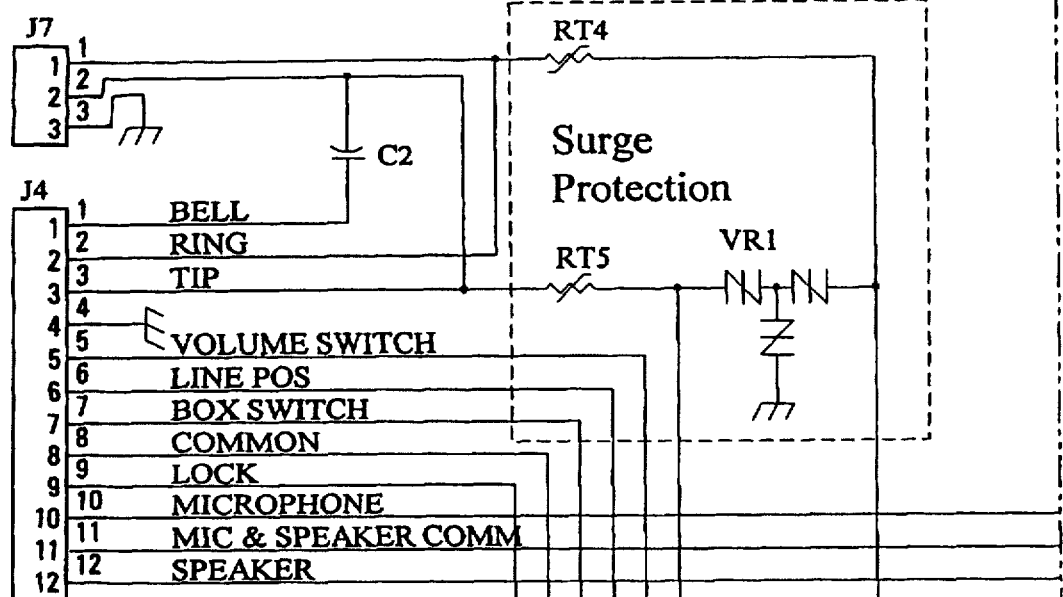
FIGS. 4A–4D are schematic circuit diagrams of the main section of the chassis electronics.
Figure 4A:
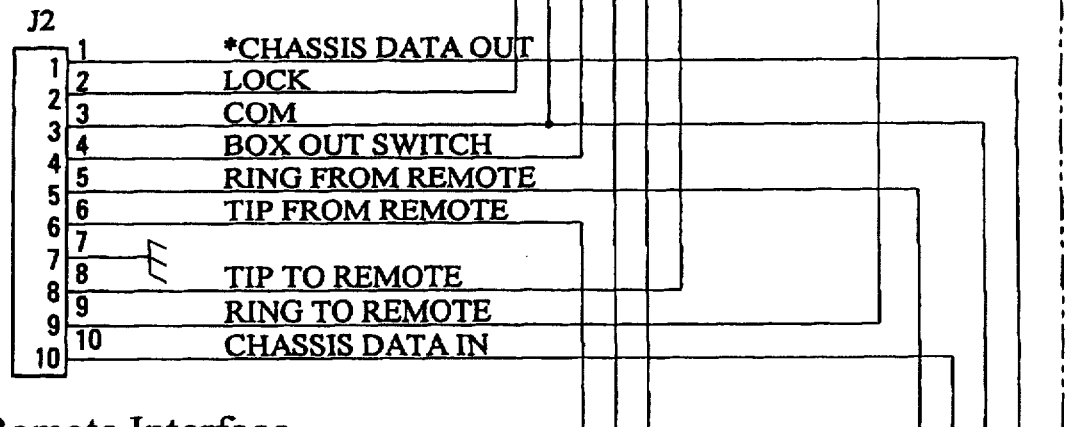

Referring to FIG. 4A, J7 is a test interface that allows technicians to verify that power is being supplied to the chassis when it is installed in the phone without opening up the phone housing. J4 is the main connector of the chassis. This connector interfaces with the telephone line, handset, volume switch, ringer, and WESROC accessories (box out switch and electronic lock). J2 is the interface for the WESROC monitoring system.

Figure 4B:
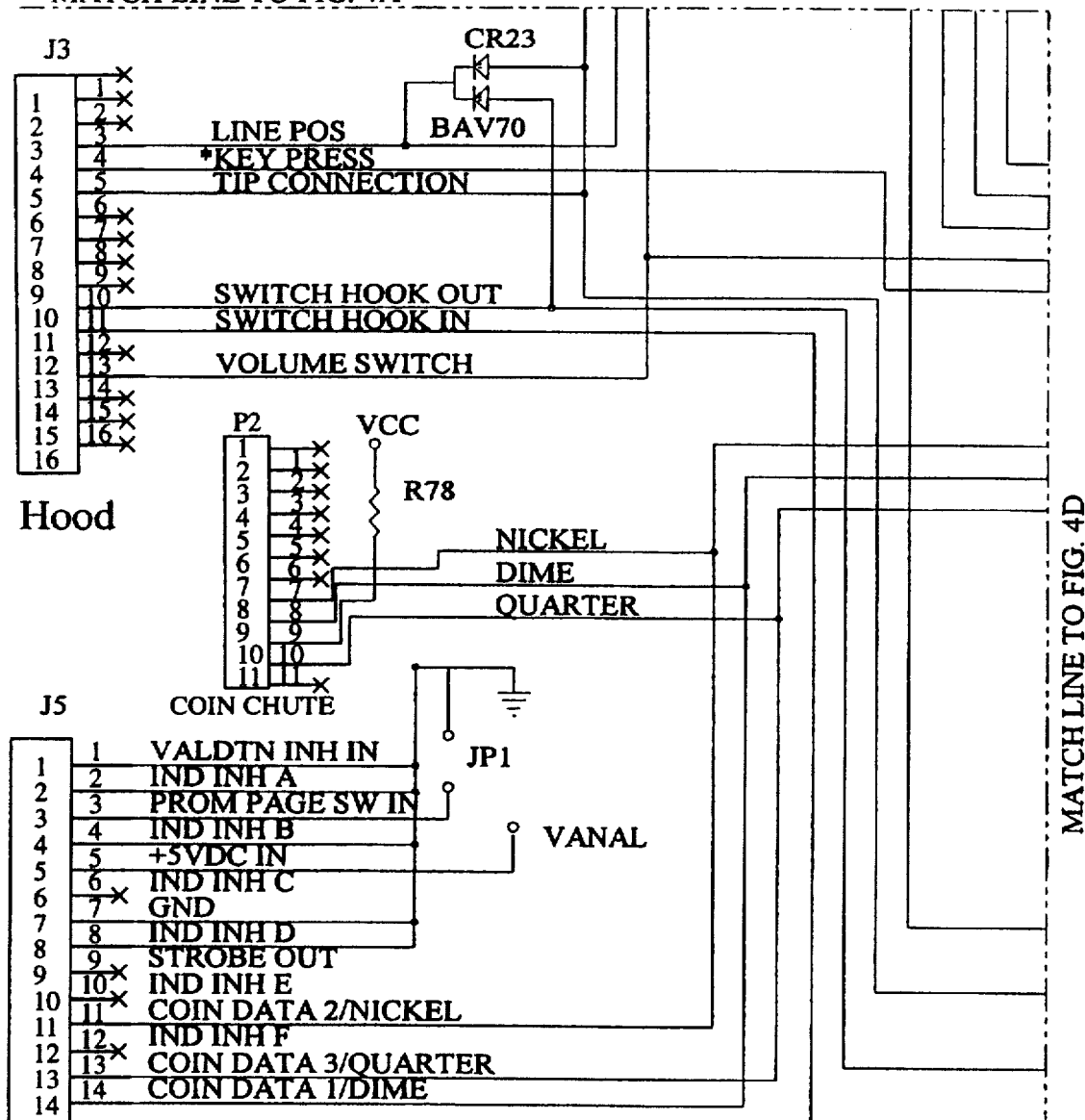
Figure 4B:
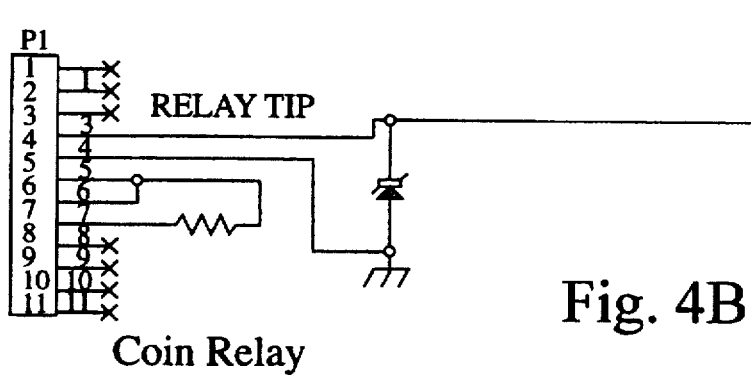
Figure 4C:
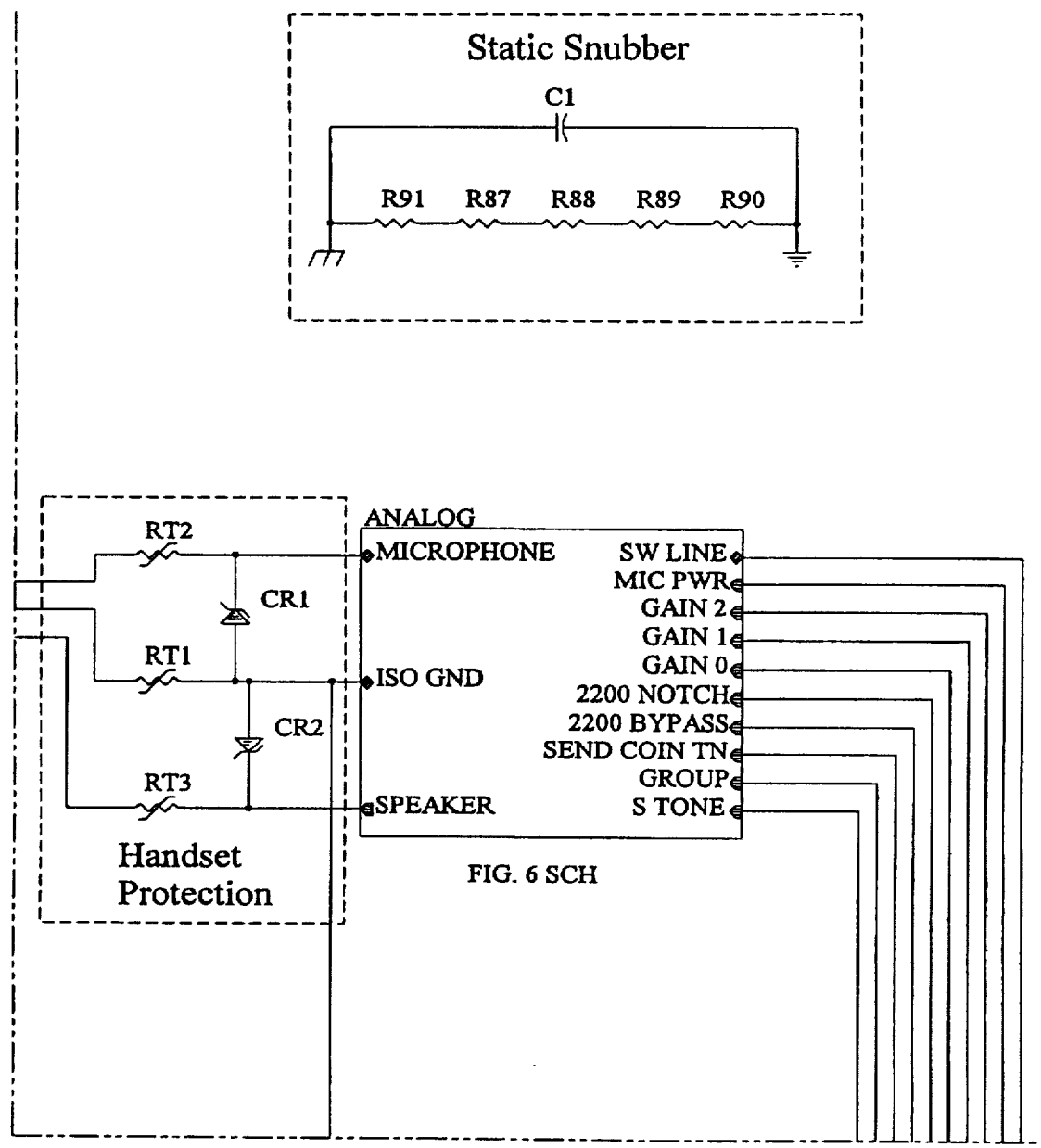

Referring to FIGS. 4A and 4C, The components of RT1 through RT5, VR1, CR1, and CR2 comprise the main lightning/surge protection of the telephone. RT4, RT5 and VR1 protect the chassis, RT1, RT2, RT3, CR1 and CR2 protect the handset. These components greatly reduce the risk of the remainder of the chassis, as well as the additional external components, from being damaged by an overvoltage or overcurrent condition. The telephone line is filtered by RT4 and RT5 and C14 shown in FIG. 4A.

Referring to FIG. 4B, J3 is the hood interface. There is also an alternate connection for the volume provided through the hood. P2 is the connector for the mechanical coin chute/trigger interface. It contains a power source, VCC for the coin chute. J5 is the connector for a MS-16 style electronic coin chute which can be used in place of a mechanical trigger. P1 is the connector to the coin relay. A mounting hole (not shown) on it is tied to earth ground. Z4 prevents large transient voltages from being "kicked" back to the chassis.

Referring to FIG. 4C, the resistor/capacitor network of C1 and R87 through R91 provides electrostatic protection between the chassis system ground and earth ground. Inputs and outputs of the analog section of circuitry are shown and their interconnection to the digital and interface sections, and to the handset protection circuitry.

Figure 4D:
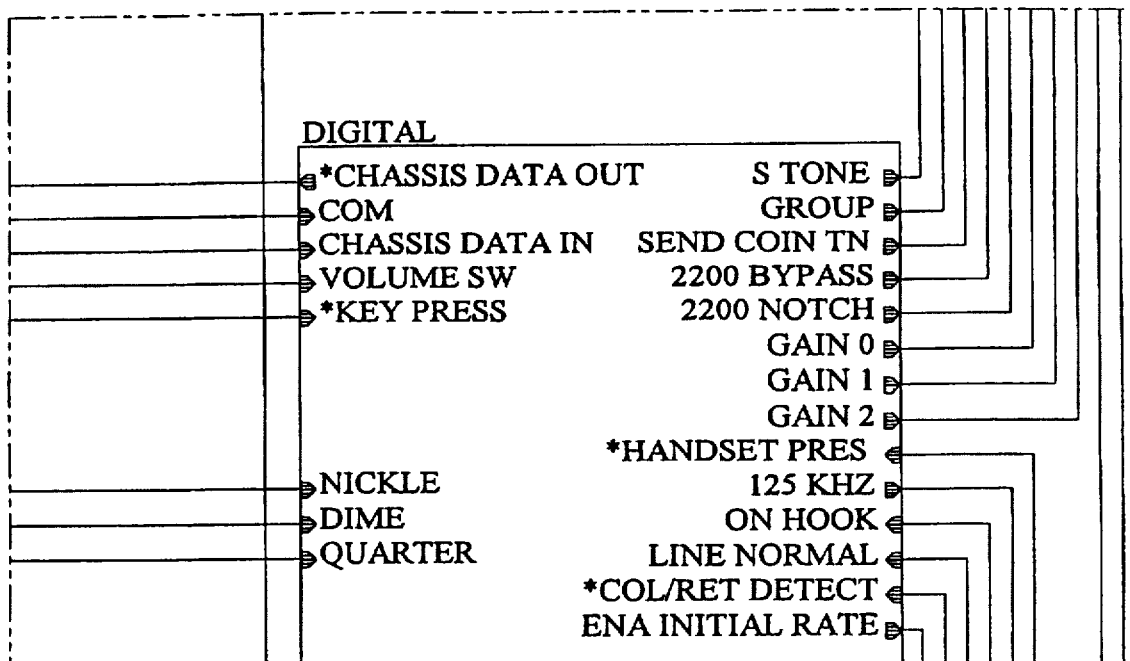
Figure 4D:
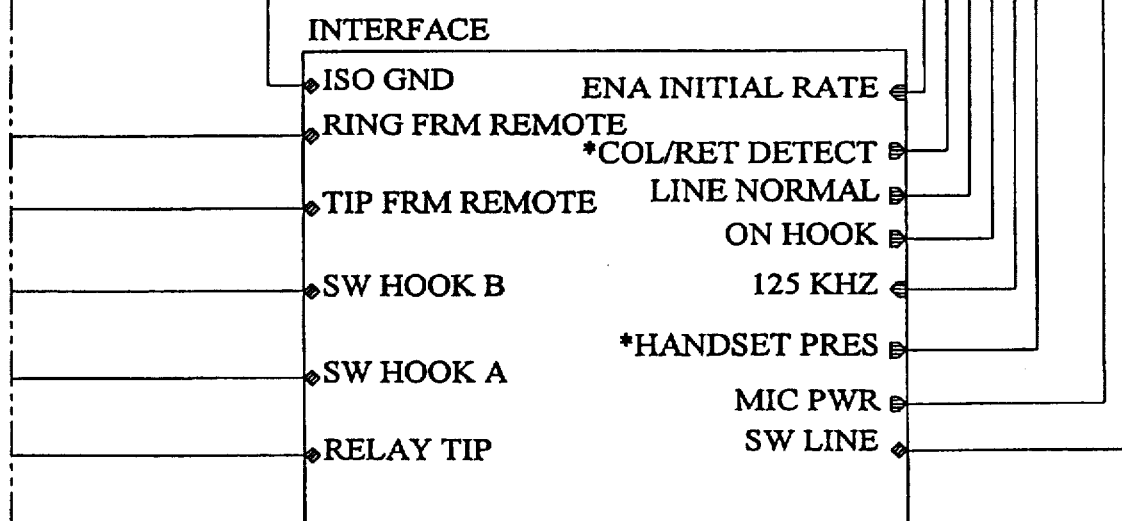

Referring to FIG. 4D, the inputs and outputs of the digital and interface sections of circuitry are shown and their interconnection to each other, the analog section of circuitry, and the various connectors.

3. Interface Section Circuitry

Referring to FIGS. 5A–5D, this interface section provides the telephone line power connection to the chassis, and generates the power for the chassis and handset. It also provides circuitry for diagnostic tests, coin control and obtaining information for the digital section.

Figure 5A:
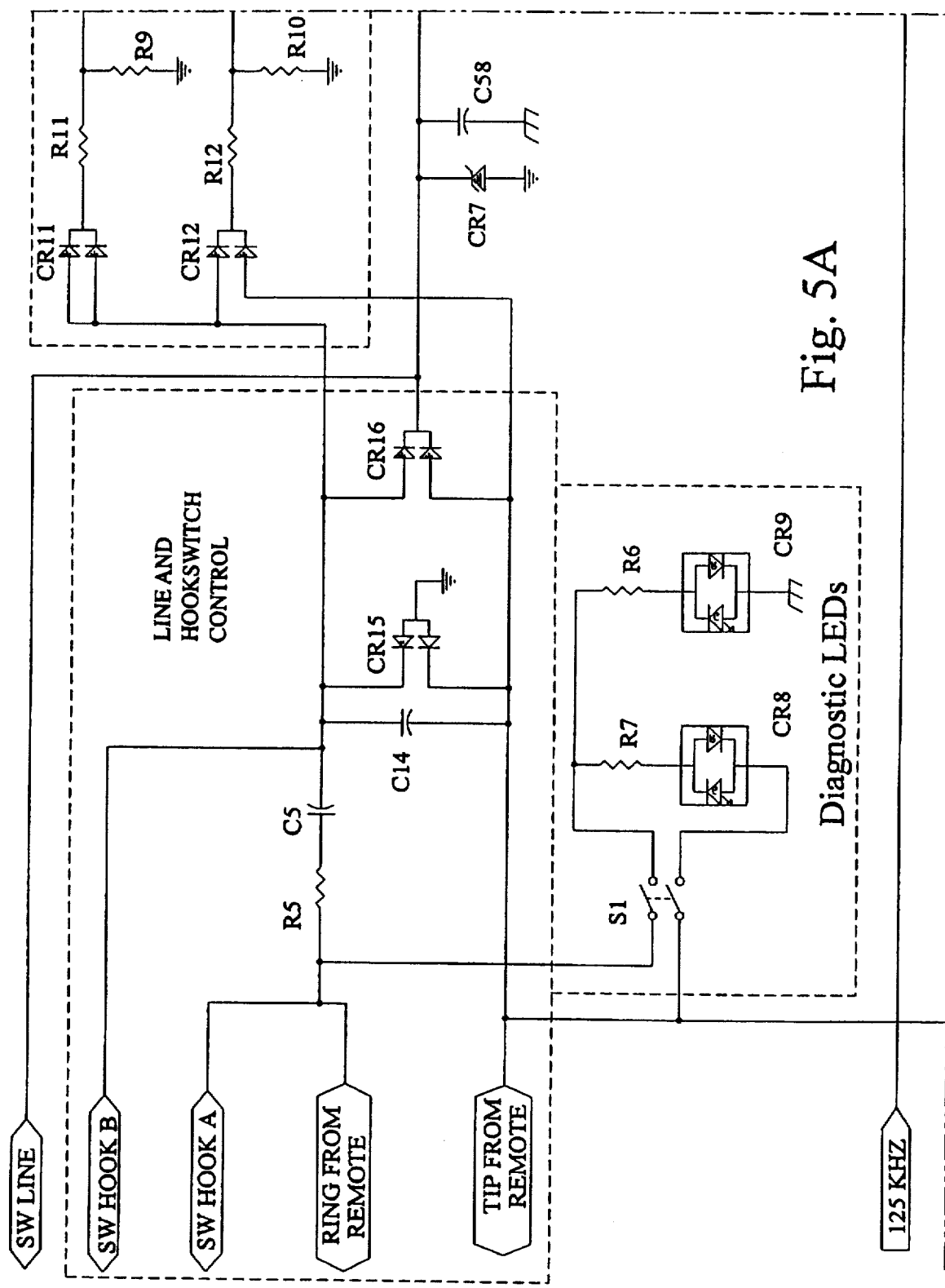
FIGS. 5A–5D are schematic circuit diagrams of the interface section of the chassis electronics.

Referring to FIG. 5A, The Diagnostic LEDs circuitry provides the diagnostic testing of the chassis. A push-to-test button 24 of FIGS. 2 and 3 activates switch S1 and causes LEDs 25 and 26 of FIGS. 2 and 3 to show the polarity of the telephone line and a proper ground connection. CR8 is the polarity LED and CR9 is the Ground LED. When the test button S1 is pushed, the LEDs will do one of three things: turn red, turn green or remain off. The TEST button will activate both LEDs. Table 1 explains what the different combinations of lights mean.

TABLE 1

| Polarity | Ground | Condition |
| --- | --- | --- |
| Green | Green | Proper Line and Ground Connections. |
| Red | Green | Polarity Reversed. Ground OK. |
| Red | Off | Polarity Reversed. Ground Unknown. |
| Green | Off | Polarity Correct. Ground Missing. |
| Green | Red | Polarity Correct. Ground Unknown |
| Red | Red | Polarity Reversed. Ground Unknown. |
| Off | Off | Line Not Connected. Ground Unknown. |

The Line and Hookswitch Control circuit debounces the hookswitch and assures proper voltage polarity for the chassis. Line power is provided to the chassis at RING FROM REMOTE and TIP FROM REMOTE, which go to the TIP and RING connections of the after going through the WESROC monitoring system via the remote interface connector J2 shown in FIG. 4A. SW HOOK A and SW HOOK B go to the hookswitch in the dial pad of the telephone. When the hookswitch goes off-hook there is a voltage drop between TIP and RING which provides power. When the phone goes off hook, R5 and C5 are shorted out or bypassed by the hookswitch. The purpose of R5 and C5 is to provide debouncing for the hookswitch. CR15 and CR16 form a diode bridge which ensures that the voltage to the rest of the circuitry will be positive regardless of the line polarity, which can change during normal operation of a coin telephone.

CR7 and C58 provide a secondary line surge and transient protection between the telephone line and power supplies.

Figure 5B:
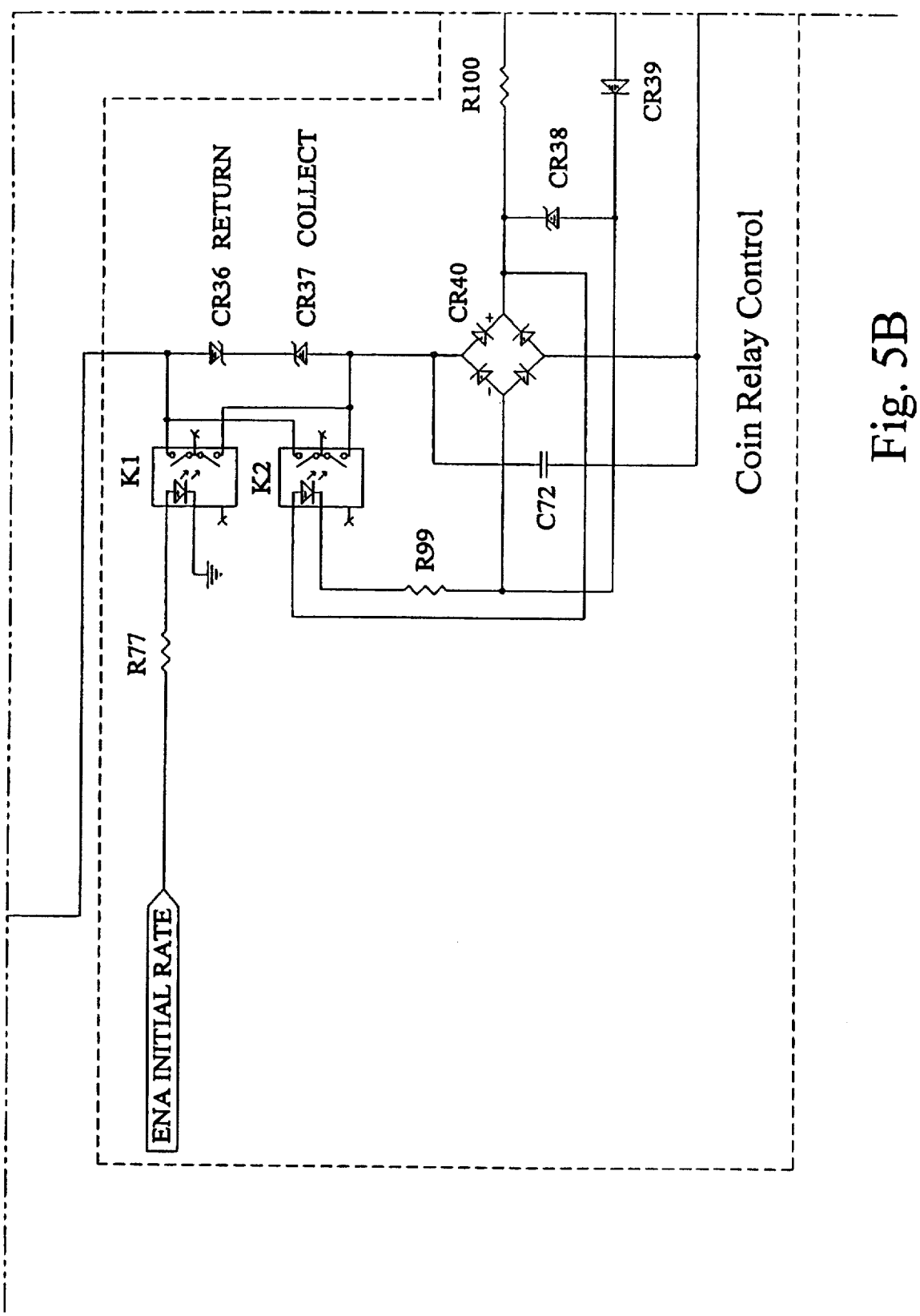
Figure 5C:
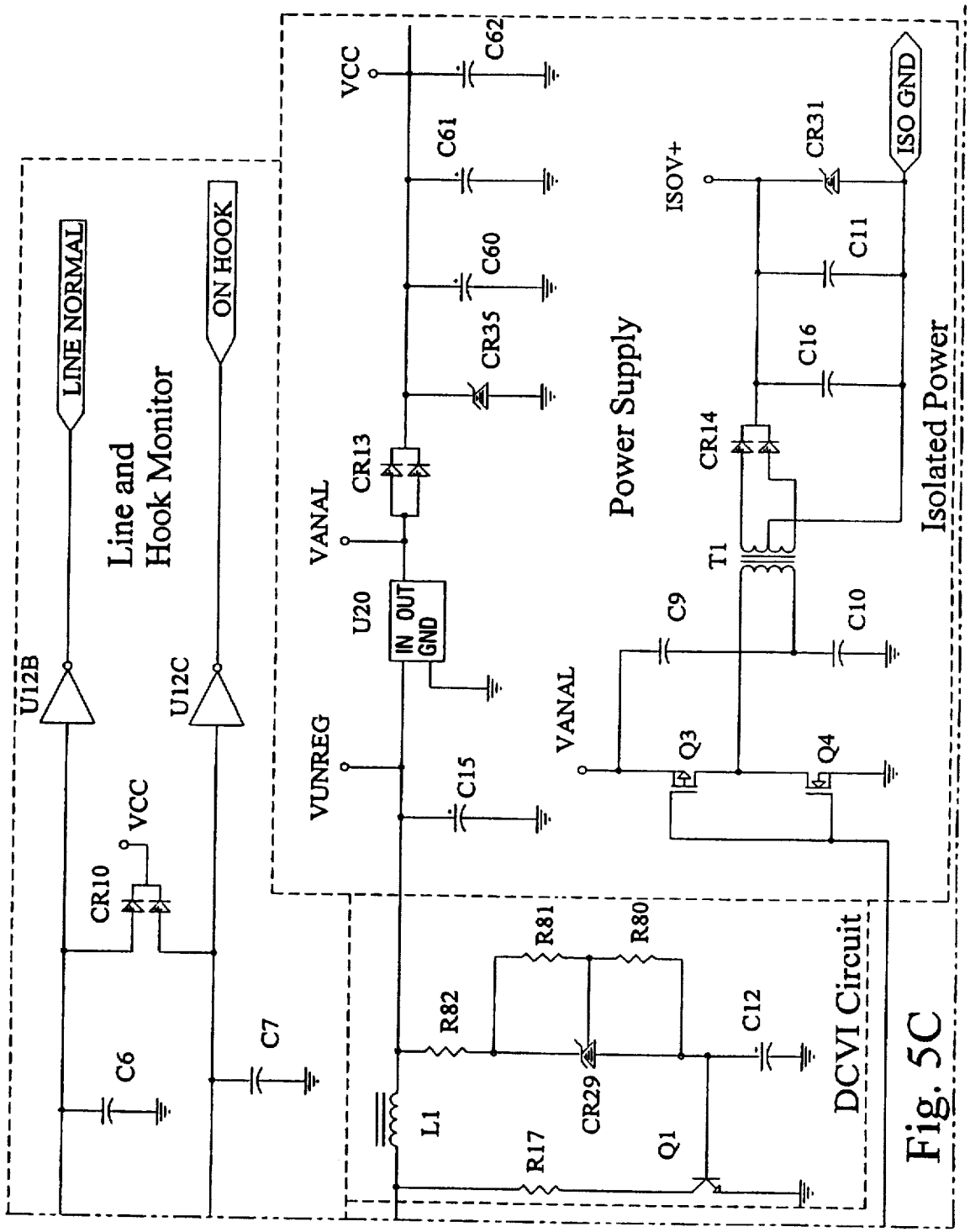

Referring to FIGS. 5A and 5C, the Line and Hook Monitor provides information to the digital section of the chassis. These circuits monitor the polarity and hook status of the telephone line. The LINE NORMAL circuit tells the microprocessor, U10 of FIG. 7D, when to insert the notch filter, which will be described later. The ON HOOK circuit tells the microprocessor when the phone is off-hook and when coin control is occurring.

Referring to FIG. 5C, the power supply circuit provides an unregulated power source and generates the various regulated power supplies used on the chassis. All of the power supply voltages are generated by an off-hook voltage drop present across the telephone line connected to the coin phone. VCC is used in the digital section. VANAL is used in the analog section of the chassis and is also used to generate an isolated voltage, ISOV, which is used to power the microphone portion of the handset. U20 is a voltage regulator which sets VANAL at 5 volts.

By using an isolated power supply, ISOV, for the handset, pin-fraud protection is provided for the chassis because there is no direct relationship between the handset and the telephone line. Power for coin control is through a circuit between TIP and ground, whereas power for other operations is between TIP and RING. Pin fraud occurs when the handset is physically shorted to earth ground. In a chassis of the present invention, the microphone in the handset is driven by the isolated power supply ISOV and isolated from TIP. When the central office checks for initial rate, if a path is present from the handset to earth ground, there will still not be any TIP to ground current via the handset microphone.

Risk of electrical damage to the chassis from a shorted out handset is also removed because such a short will not cause an increase in line current. CR 35 provides additional transient and surge protection for VCC and VANAL, and CR31 provides additional transient and surge protection for ISOV.

In the off-hook state, loop current from the telephone line is sufficient and ample to power the chassis, and the chassis relies on this loop current to power it. The chassis does not store any information and there are no activities to be performed while on-hook, so the chassis needs no power to it in the on-hook condition, and therefore, has no battery. However there are instances of less than one second duration during coin control where there is no loop current present but where the microprocessor U 10 (FIG. 7D) must remain powered and active. During coin control, which occurs during and immediately following a phone call, the loop is opened at the central office and a signal is applied between TIP and Ground. Power is maintained to the microprocessor by large capacitors C60, C61, C62 on VCC. The capacitors C60, C61, C62 slowly discharge after loop current is removed. It takes 8–10 seconds for them to discharge enough to turn off the microprocessor.

Immediately to the left of the power supplies is the DC Voltage and Current (DCVI) circuit. This circuit controls the relationship of off-hook voltage to loop current. This circuit regulates the amount of current that gets to the power supplies. There is a relationship between loop current and off-hook voltage. As loop current rises so does the off-hook voltage. This in part is the reasoning for the minimum loop current requirement of 23 milliamperes. When the current drops below this value, the voltage may be too low to operate all of the components in the chassis. On lines where loop current is high, greater then 80 milliamperes the off-hook voltage could rise to a value that would be too high for the central office to recognize that the phone is off-hook. Also if there isn't adequate protection on the chassis, this high voltage would damage the chassis. It is desirable to keep the off-hook voltage below 16 volts. A DCVI circuit is needed to adjust the effective resistance of the chassis to keep the off-hook voltage within in the acceptable range. Without the DCVI circuit, all of the loop current would go through L1 and into pin 1 of U20. This would give a off-hook voltage, between TIP and RING when the phone is off-hook, of about 18 volts with a loop current of 80 milliamperes. The components of CR29, R80 and R81 comprise a voltage reference that will keep the voltage across pins 4 and 8 of CR29 to 5V. R82 provides current limiting and allows VUNREG to rise above 5V. At low loop currents, this circuit doesn't come into play. When the current rises, the voltage at VUNREG rises thus raising the voltage on the base of Q1. This "turns on" Q1 and provides a current path through R17 and Q1. The higher the loop current, the "harder" Q1 turns on, the more current that gets diverted through R17. This process keeps the off-hook voltage well below the 16 volt maximum level. At 100 milliamperes current, the DCVI circuit keeps the off-hook voltage at 12 volts.

Figure 5D:
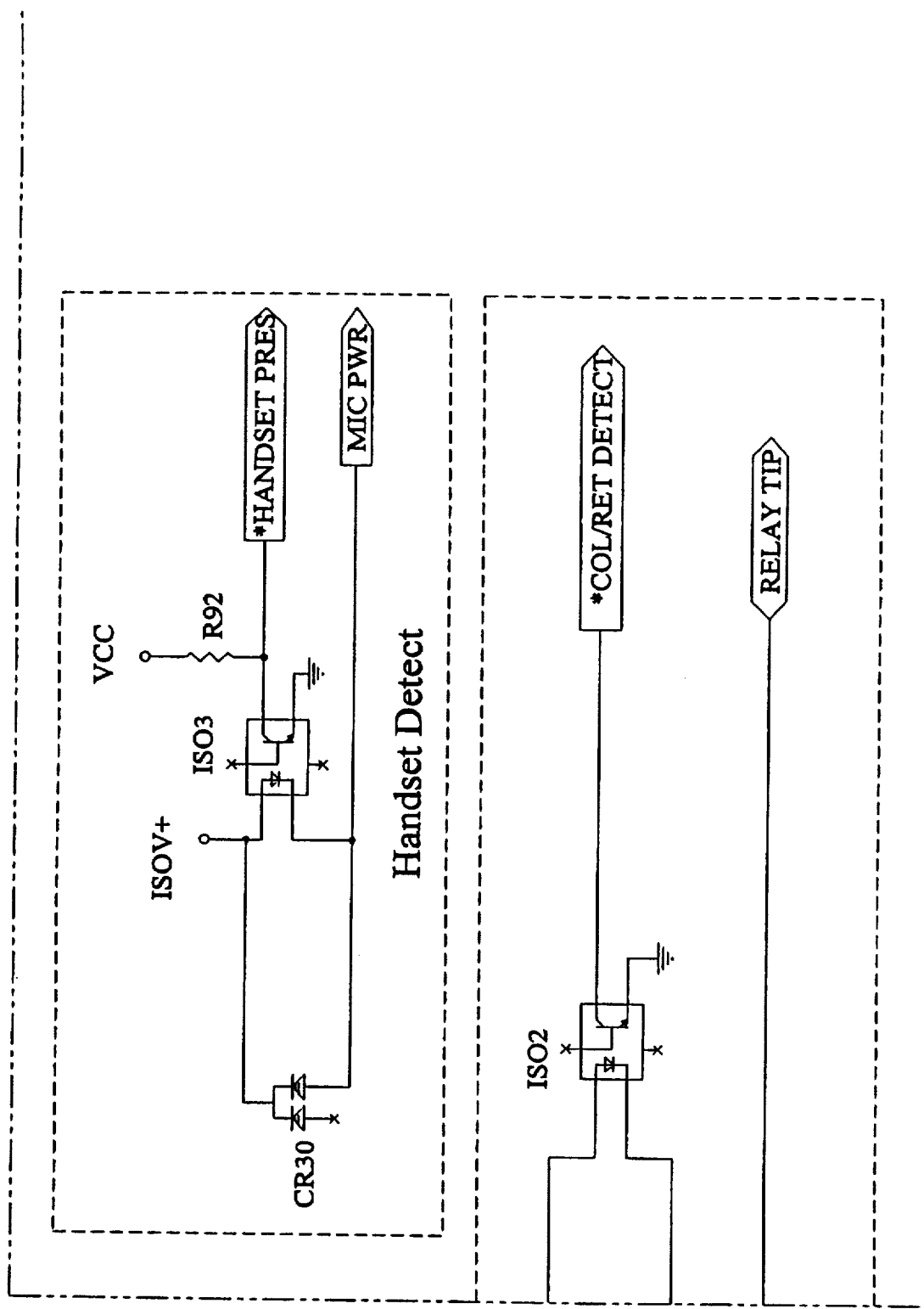

Referring to FIGS. 5B and 5D, the coin relay control circuitry is used in conjunction with the central office and the coin relay to determine if a phone call should be allowed to complete and to discharge coins to the appropriate location. If the microprocessor U10 or other circuitry needing input from the microprocessor fails, the coin relay control circuitry will still collect and return money. The collect and return signals from the central office are high voltage signals between TIP and Earth Ground that pass through the WESROC remote unit and enter the coin relay control circuitry at TIP FROM REMOTE. The signal passes through Zener diodes CR36 and CR37, which determine whether the signal was "collect" or "return". The "collect" signal is opposite polarity from the "return" signal. K2 or K1 then shorts CR36 and CR37 so the high voltage signal will pass directly to the coin control relay at RELAY TIP. K2 does it at the end of a call when the central office collects or returns money. K1 does it at the beginning of a call when the initial rate is being checked by the central office. Initial rate selection is accomplished through a set of dip switches 23 (FIGS. 2 and 3). At ENAble INITIAL RATE, microprocessor U10 (FIG. 7D) determines if enough money has been deposited to meet the initial rate, and sends a signal to K1. Diode bridge CR 40 makes sure pin 1 of K2 is positive regardless of the polarity of the line signal. CR38, CR39 R100, and ISO2 detect and process the signal and send information to the microprocessor U 10 at *COLect/RETurn DETECT.

Referring to FIG. 5D, the Handset Detection section provides circuitry that will check to see if a handset is connected to the chassis and send a signal at *HANDSET PRESent to the microprocessor U10. This feature is used in conjunction with the WESROC monitoring system to assist in the maintenance of the telephone. The chassis will tell the WESROC remote unit that the handset is missing. The remote unit will then report this to the host unit which will flag this and put the unit on a repair list. This promotes rapid repair of damaged telephones. This feature does not affect the use of the chassis. MIC POWER is an input/output label for the schematic diagrams representing ISOV+.

4. Analog Section Circuitry

Referring to FIGS. 6A–6D, the analog section provides the coin tone generation, transmit and receive amplification, tone fraud prevention, and volume control circuitry of the chassis.

Figure 6A:
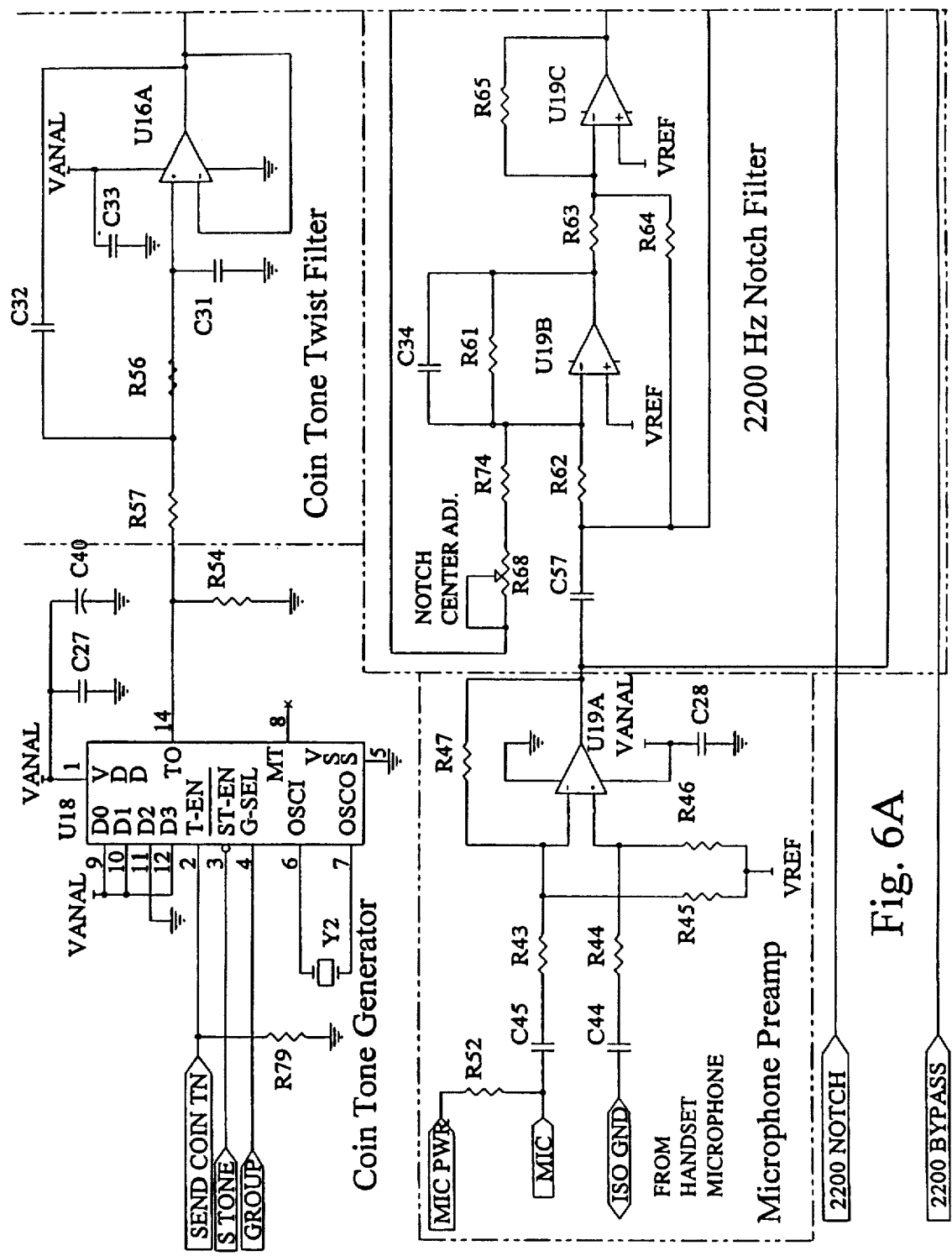
FIGS. 6A–6D are schematic circuit diagrams of the analog section of the chassis electronics.

Referring to FIG. 6A, the Coin Tone Generator and Coin Tone Twist Filter circuits generates the coin tones and adjusts their twist and amplitude before sending them to the telephone line. The coin tones are generated by an oscillator Y2 driven Dual Tone Multi-Frequency (DTMF) transmitter operating at 6.5 MHz. The frequency of the oscillator Y2 determines the frequencies of the coin tones transmitted.

Figure 6B:
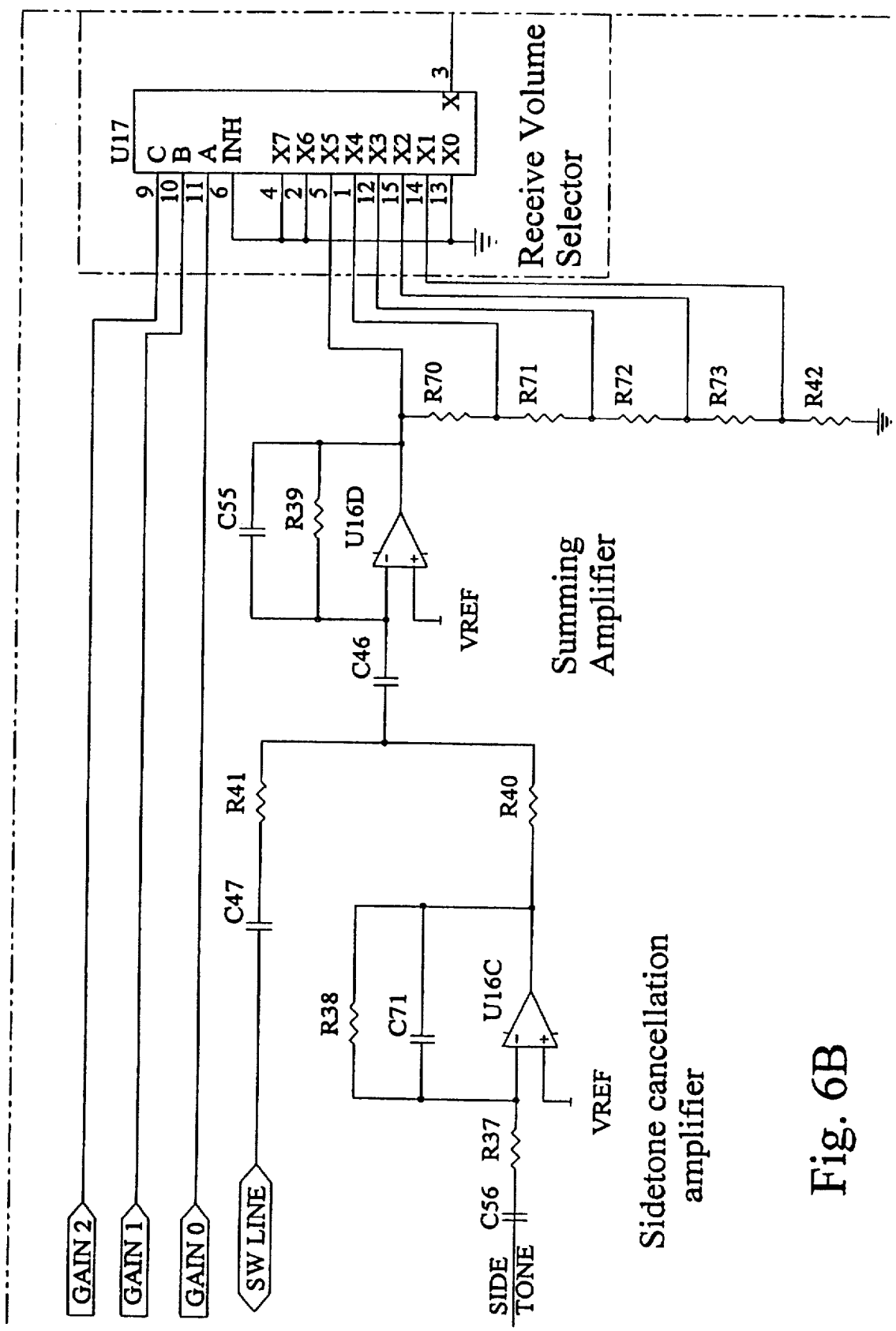
Figure 6C:
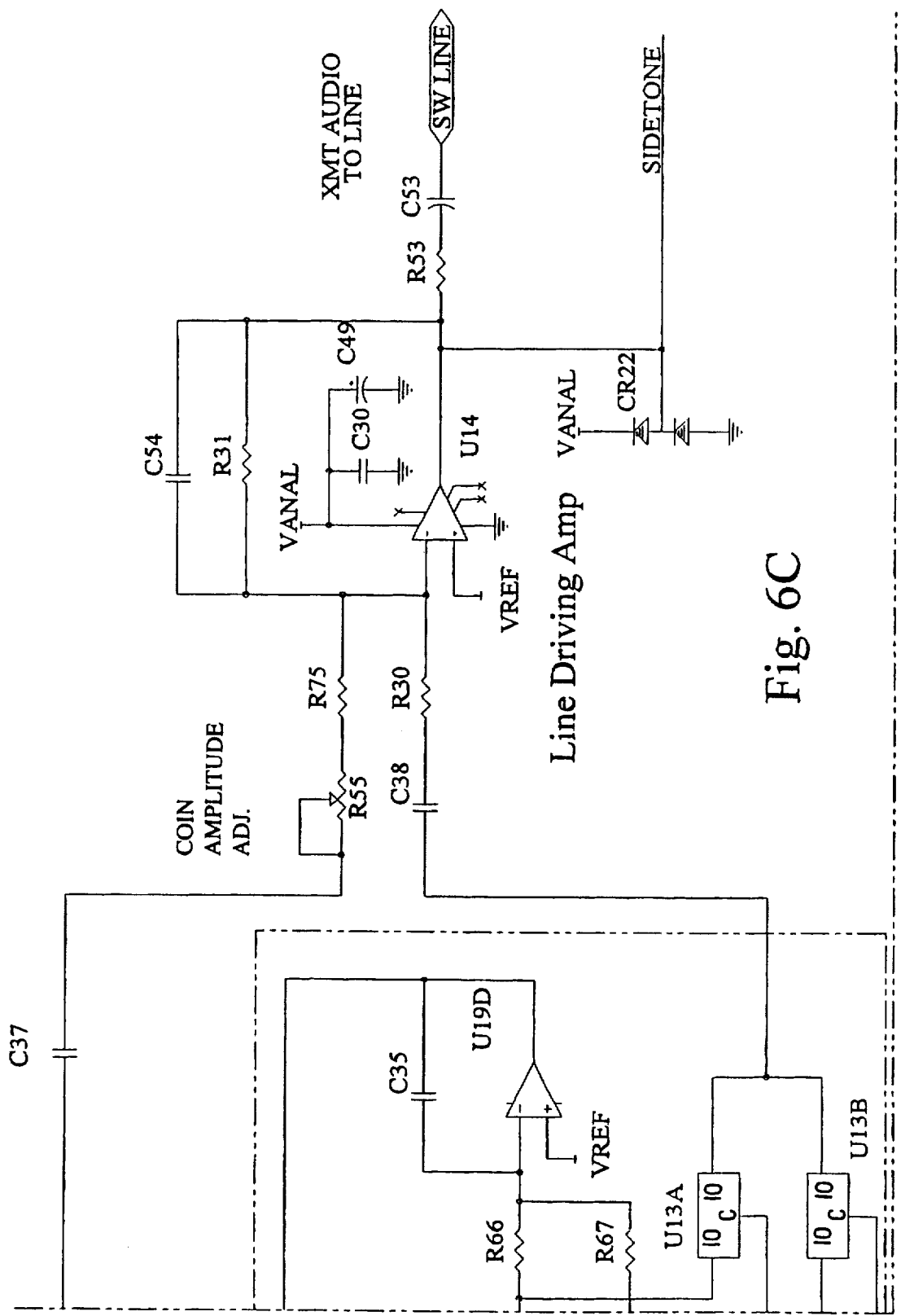

Referring to FIGS. 6A and 6C, the remaining circuitry on these figures is the transmit circuitry of the chassis. U14 and surrounding components is a frequency compensate amplifier for coin tones, microphone, and output to the phone line. The majority of the time, the signal from the microphone, MIC, is just amplified through U19A, sent through electronic switch U13B to C38, amplified through U14, and sent out to the telephone line at SW LINE. The 2200 BYPASS signal from the microprocessor U10 keeps this path active. However, in situations where tone fraud may be possible, particularly on long distance calls where additional money is required, the signal from the microphone, MIC, goes through a notch filter circuit prior to being amplified through amplifier U14 and going to the telephone line. The central office identifies this situation with a line reversal. The microprocessor U10 (FIG. 7D) senses this condition and opens switch U13B and closes switch U13A via 2200 NOTCH and 2200 BYPASS signals which forces the signal to go through the 2200 Hz notch filter. The notch filter removes all 2200 Hz components that may be transmitted into the microphone. This frequency is one of the components in a coin tone. When coin tones are transmitted, the central office monitors the tones with an automated coin tone system. If the 2200 Hz. frequency is present, the coin tones were generated from the chassis by the coin chute, and payment is registered. If recorded coin tones were transmitted into the microphone, the 2200 Hz. frequency component will be missing, and the chassis will do whatever the automated coin tone system directs it to do, such as return coins deposited and disconnect. Tone fraud is thereby prevented with the built in circuitry in this section of the chassis.

Figure 6D:
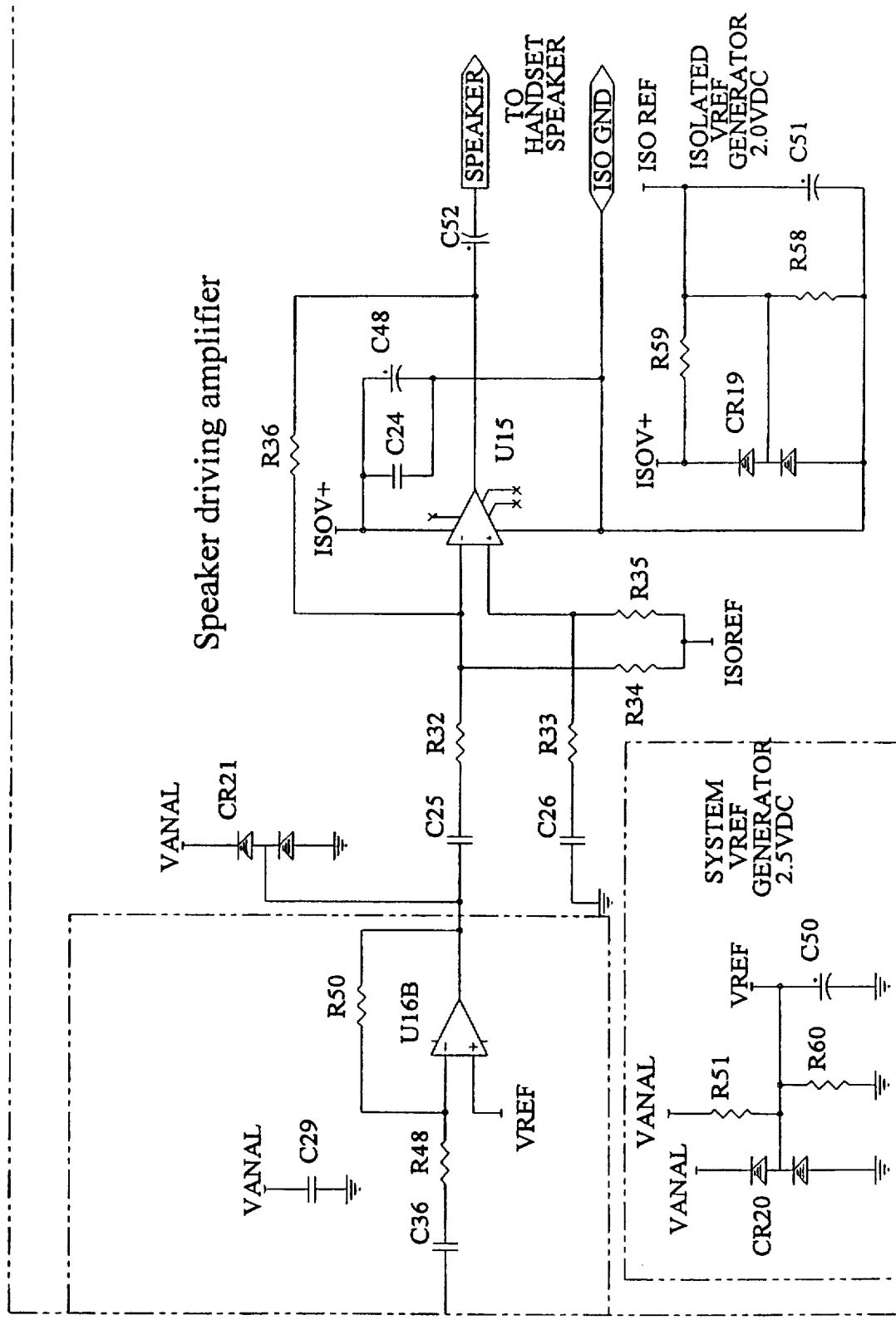

Referring to FIGS. 6B and 6D, these circuits are the receiver section of the chassis. The speaker receives signals from two sources: the telephone line (other party) at SW LINE, and microphone feedback at SIDETONE. U17 and the resistor network of R70, R71, R72, R73, and R42 provide 4 amplification and 2 attenuation levels for the speaker. These are controlled by the digital section through the GAIN 0, GAIN 1, and GAIN 2 control lines. The amplification levels are accessed by the user via the volume switch. The attenuation levels are accessed by the digital section. One level is referred to as a "soft" mute, which is utilized to attenuate the tones coming from the dial pad on the hood. The other level is referred to as a "hard" mute. This level is utilized when coin tones are being transmitted to prevent someone from recording them.

Referring to FIG. 6D, U15 and surrounding components comprise a frequency compensate amplifier for the speaker. A reference voltage generator circuit is shown which receives VANAL and generates the reference voltage, VREF, for all the amplifiers in FIGS. 5A–5D using VREF.

5. Digital Section Circuitry

Referring to FIGS. 7A–7D, the digital section receives and provides digitally buffered signals to and from all of the other sections. The digital section provides coin chute signal interpretation, initial rate processing, and it has the main component of this section, microprocessor U10 shown in FIG. 7D. The microprocessor U10 analyzes all of the information it receives and controls various components of the chassis.

Figure 7A:
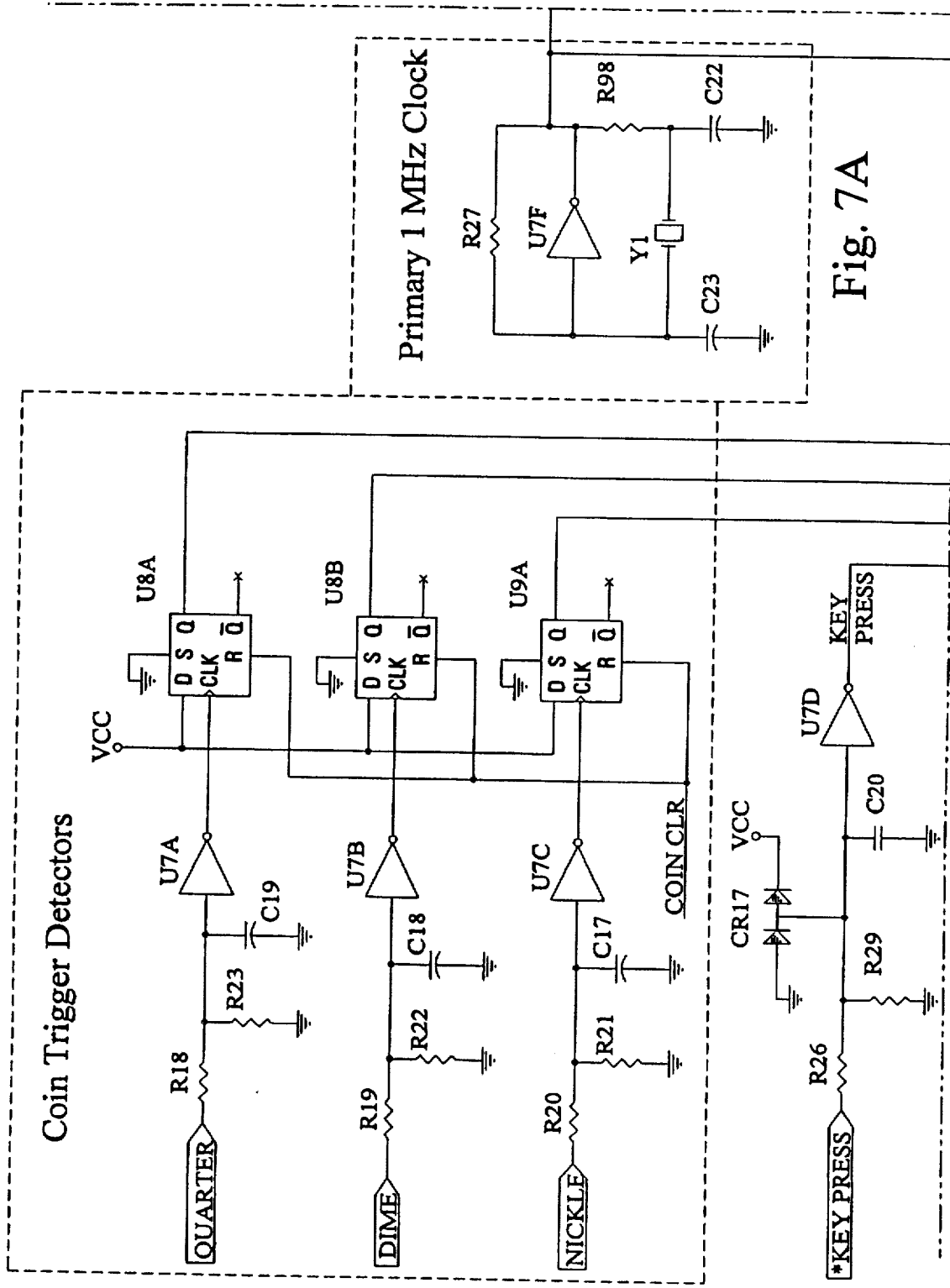
FIGS. 7A–7D are schematic circuit diagrams of the digital section of the chassis electronics.

Referring to FIG. 7A, the Coin Trigger Detection circuitry detects the various coins, quarter, dime, or nickel, that can be deposited into the pay phone at the coin chute. The coin chute signals are conditioned and buffered by the components R18, R19, R20, R21, R22, R23, C17, C18, C19, U7A, U7B, U7C, U8A, U8B, and U9A. The microprocessor U10 uses this information to interpret the coin chute signals and transmit the appropriate coin tones at SEND COIN TN. All coin tone timing is done by the microprocessor Referring to FIGS. 7A and 7B, the various logic inputs for the microprocessor are shown. Components R26, R29 CR17, C20 and U7D debounce and digitally buffer the keypad switch inputs at KEY PRESS as well as protect them from electrostatic discharge and radio/electromagnetic interference. Components R24, R76, CR18, C21, and U7E do the same for volume switch input at VOLUME SW.

Other inputs are: LINE NORMAL, ON HOOK, HANDSET PRESent, and COLlect/RETurn DETECT. The coin relay operation is controlled from the central office whereby collect and return signals from the central office are interpreted by the microprocessor U10 and passed to the coin relay control circuitry shown in FIGS. 5B and 5D.

Figure 7B:
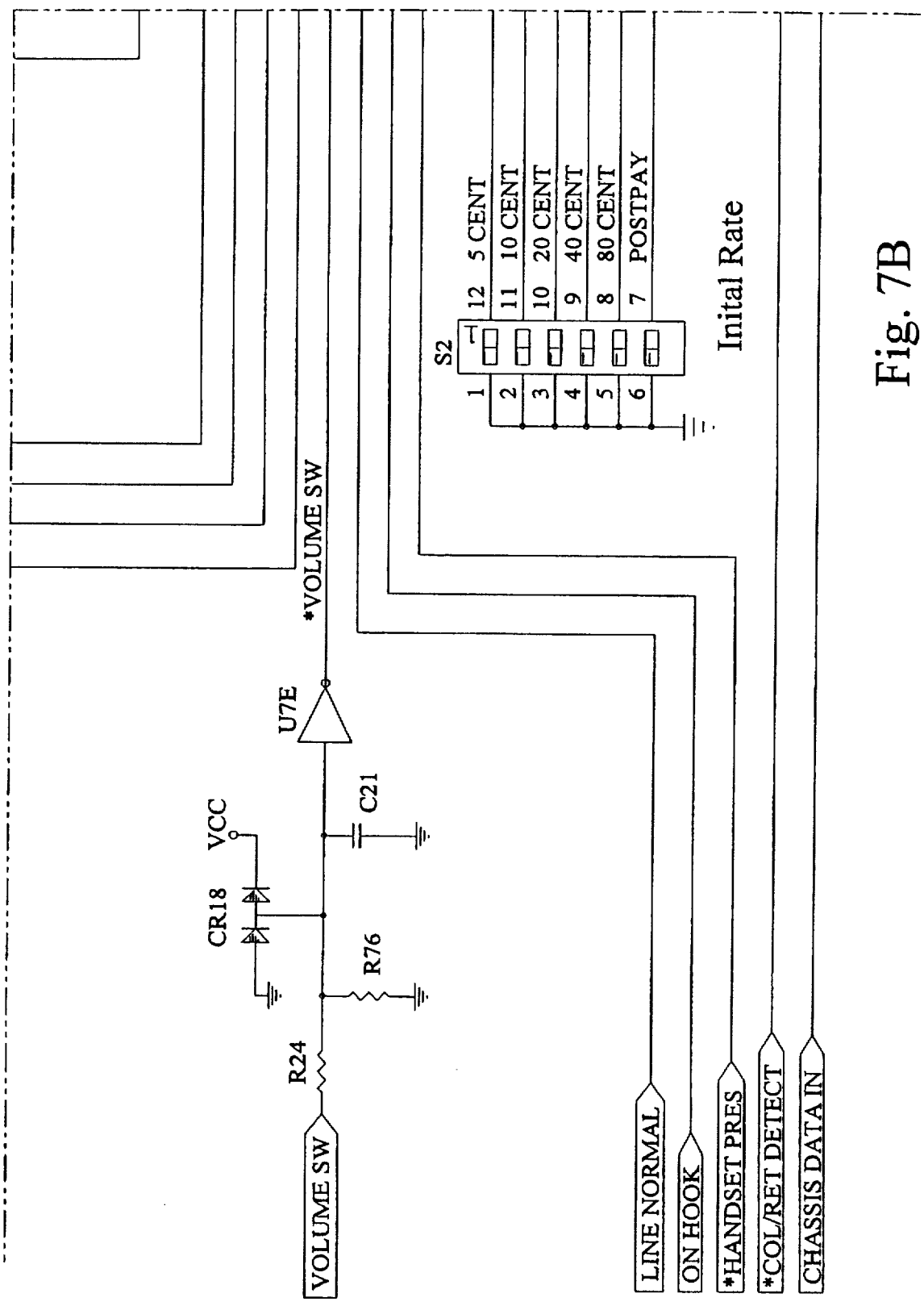

Referring to FIG. 7B, the initial rate dip switches S2, which are item 23 in FIGS. 2 and 3, set the initial rate for connecting a local call. Switches S2 settings are input into microprocessor U10, which then monitors the coins deposited to determine if enough money has been deposited to allow completion of the phone call. One of the switches on S2 informs the microprocessor whether the chassis is set up for postpay or prepay operation. Initial rate information, as set by dip switches S2, is compared with information received from the coin chute. A comparison is made to determine if initial rate has been met. If initial rate is achieved, the digital circuit will signal the central office to let the call pass through. If initial rate is not met, the chassis will not signal the central office to permit the call to complete.

Figure 7C:
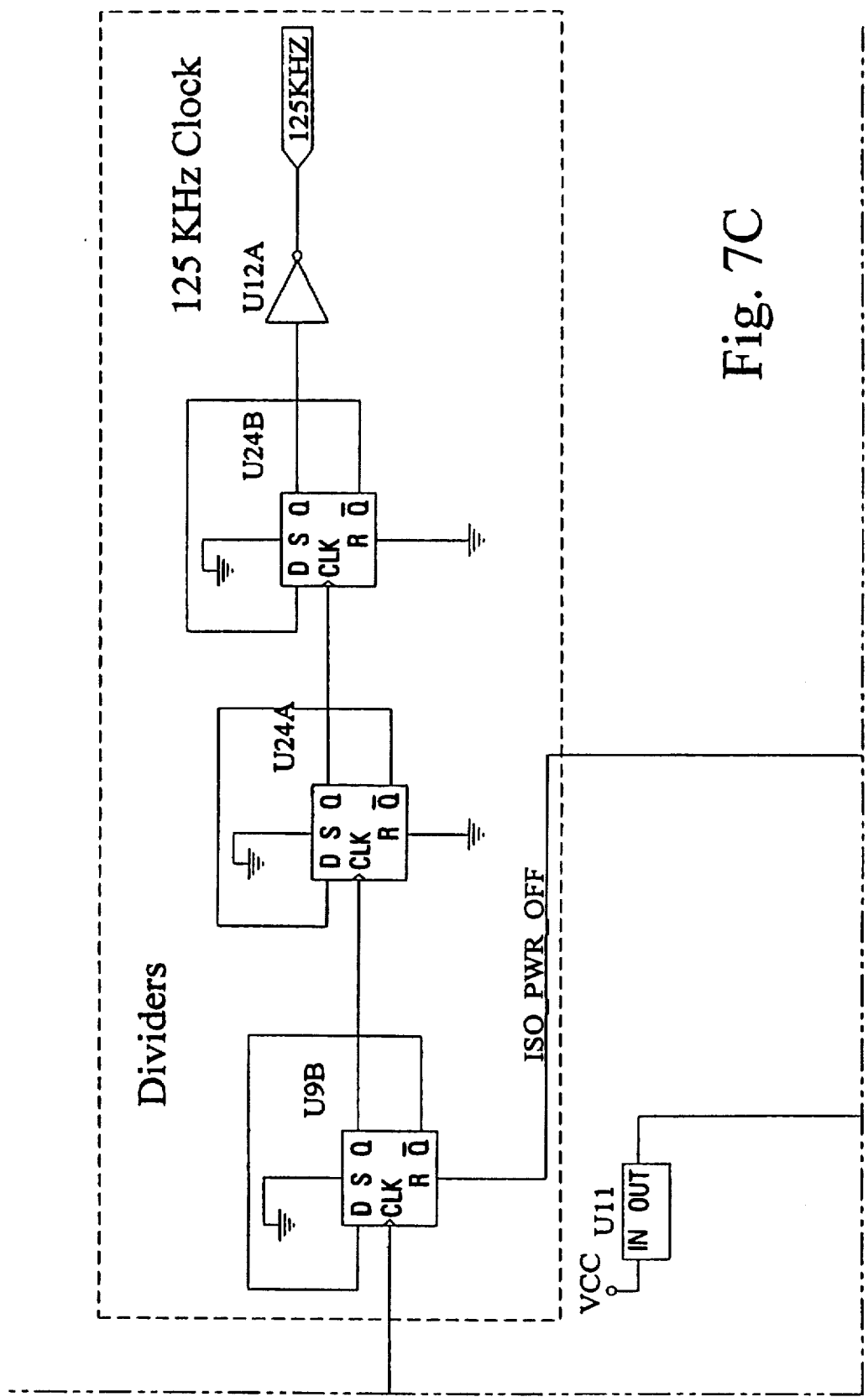

Referring to FIGS. 7A and 7C, the primary oscillator circuit for the microprocessor U10 is shown in FIG. 7A. The oscillator Y1 for this circuit has a frequency of 1 MHz, and this frequency is divided in half three times by the dividers at U9B, U24A, and U24B to obtain a 125 KHz frequency used to drive the circuitry that generates the isolated power supply in the interface section. An input ISO PoWeR OFF comes from the microprocessor U10 at RE1 to turn off the dividers so a 125 KHz signal is not produced. The 125 KHz signal is not turned off during phone operation.

Referring to FIG. 7C, a voltage detector U11 is connected between VCC and the "Master Clear", at /MCLR, of the microprocessor. This achieves two functions. First, on power up it gives time for the primary oscillator circuit to stabilize and for the microprocessor to power up prior to start of operation. Second, on shut down, it shuts down the microprocessor when the voltage from the hold-up capacitors (C60–C62 of FIG. 5C) gets below 2.7 Volts to prevent it from operating at too low of a voltage. Without voltage detector U11, the microprocessor would try to operate at extremely low voltages as the hold-up caps slowly drain. That could cause a software latch up.

Figure 7D:
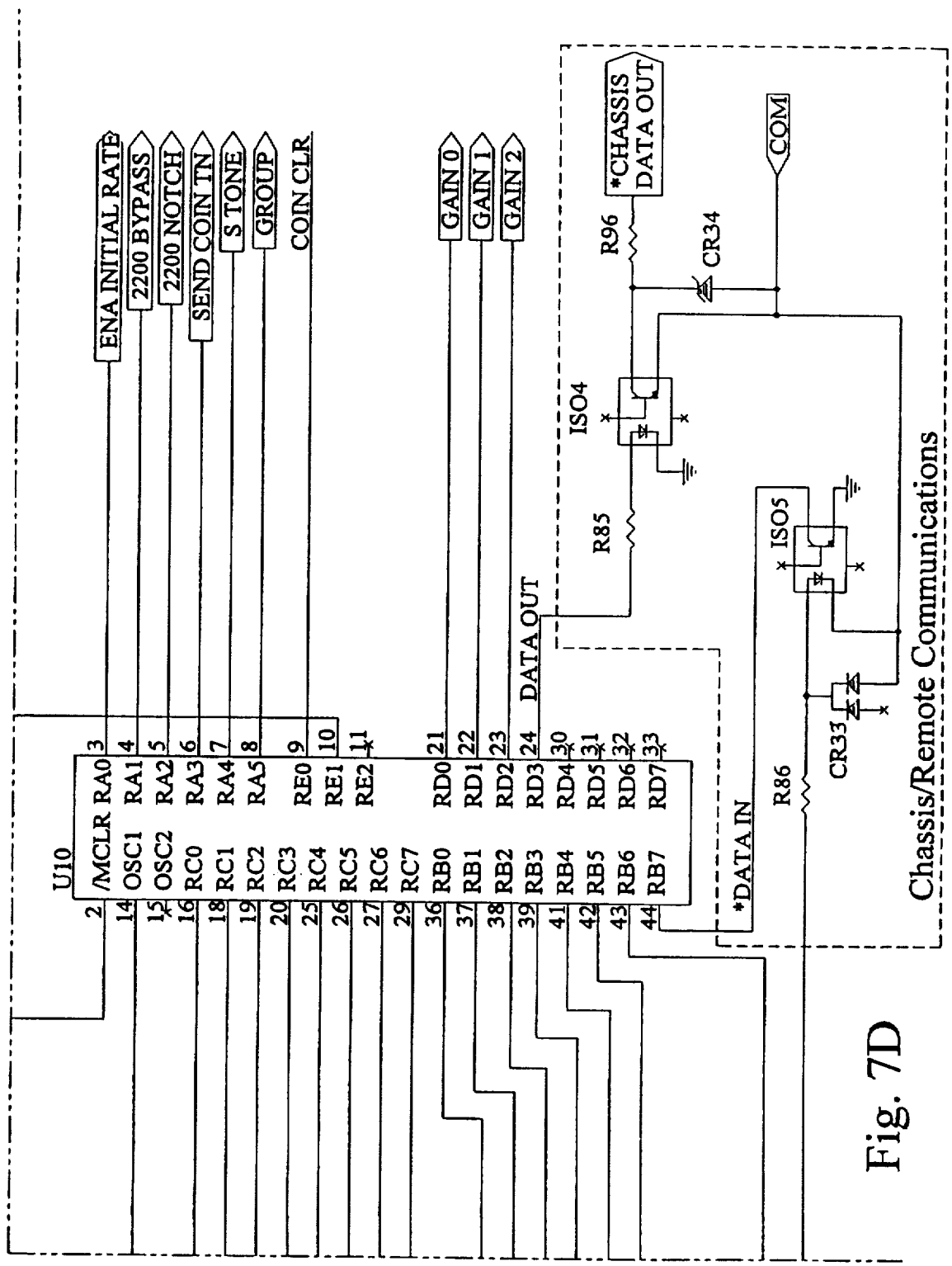

Referring to FIG. 7D, microprocessor U10 is shown with its various outputs to other sections of the chassis. Also shown is Chassis/Remote Communications circuitry used in conjunction with the WESROC monitoring system. This circuitry provides a direct, serial communication link at CHASSIS DATA OUT, COM and CHASSIS DATA IN between the microprocessor U10 and the WESROC remote unit. Three types of Information are communicated through the CHASSIS DATA OUT port to the WESROC remote unit: identification of the unit as a telephone chassis, coin box totals and trouble conditions.

6. Microprocessor Software

Referring to FIGS. 8–19, flow diagrams of the various routines performed by software modules in microprocessor U10 are shown.

Figure 8:
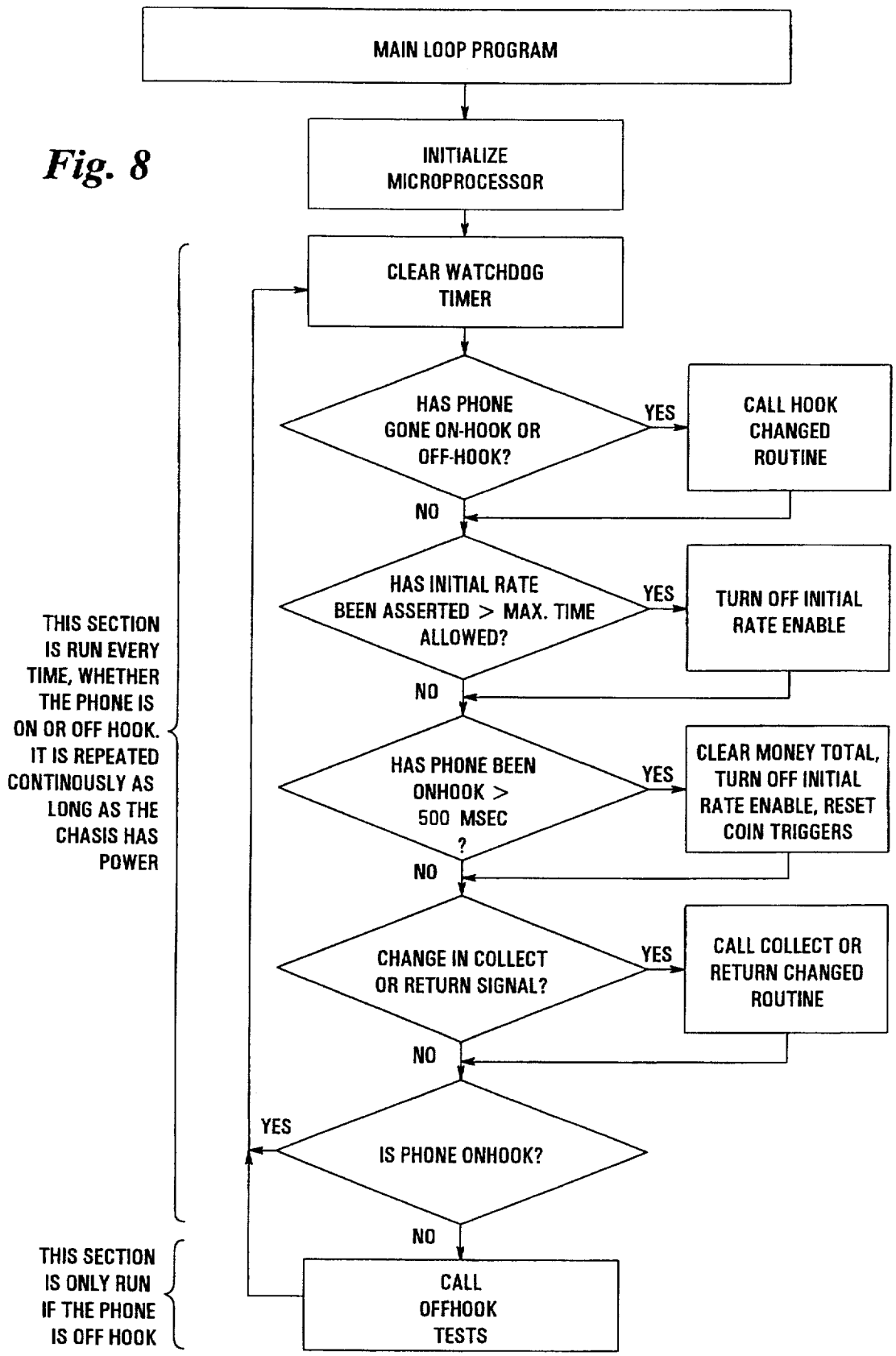
FIG. 8 is a flow diagram of the Main Loop program in the chassis microprocessor software.

Referring to FIG. 8, the Main Program is the main loop of the software, the microprocessor continually runs this section while the chassis is powered up. It will remain powered up while the chassis is off-hook and for 10 seconds after the chassis goes on-hook. This routine checks to see if there is any change in hook status and collect/return status. It determines when to remove the initial rate assertion and when the current phone call is completed. It takes a few microseconds to complete this loop.

The microprocessor U10 is initialized on power up, which sets up its ports and clears out all of it's internal registers. All of the flags are set to their "false" indications. When the microprocessor sees a change on the ON HOOK port, it will set a hook change status bit. This will initiate the call to the Hook Changed routine.

There is an Initial Rate Timer that is used to see if initial rate has been asserted the correct amount of time. When this timer goes for 1 second, a signal is sent to clear the ENAble INITIAL RATE output on the microprocessor.

A completed call is determined by the microprocessor detecting an on-hook condition for 500 ms. The microprocessor then clears out all of the information related to that call and prepares for a new one.

When the microprocessor detects a change in the COLlect/RETurn DETECT port, it sets a COLlect/RETurn change status bit. This will initiate the call to the Collect or Return Changed routine.

When the ON HOOK port is low the microprocessor will do the offhook tests, otherwise it will go back to the start of the loop.

Figure 9:
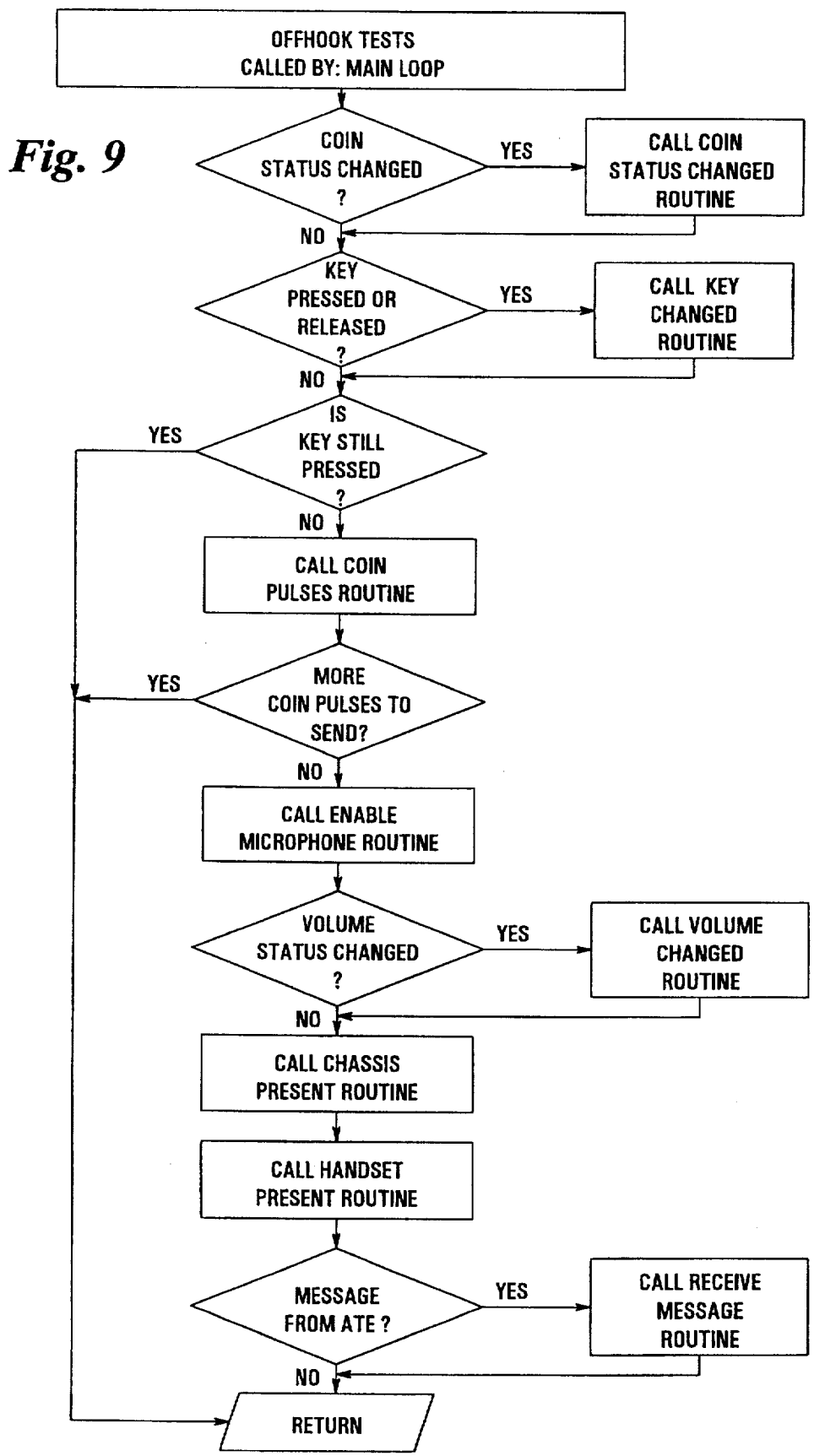
FIG. 9 is a flow diagram of the Offhook Tests routine in the chassis microprocessor software.

Referring to FIG. 9, the Offhook Tests module is traversed whenever the chassis is off-hook. It monitors for coin deposits, dial pad key presses, volume switch closures and inbound communication. This module also is responsible for transmission of coin tones, checking for handset, and indicating the presence of the chassis and status of the handset to the WESROC remote unit.

A Coin Change status bit will be set when a logic high is seen by the microprocessor on any of the pins connected to the output of U8A, U8B, or U9A. This will initiate a call to the Coin Status Changed routine.

A Key Change status bit will be set with any change on the KEY PRESS pin of the microprocessor. This will call the Key Changed routine.

If a key on the dial pad is pressed (signified by a logic high on KEY PRESS line), the microprocessor will exit this module. This is done to give the DTMF tones from the dial pad priority over the coin tones. If no key is being pressed, the microprocessor will call the Coin Pulses routine. Only one "pulse" of the coin tone will be transmitted with each iteration of the module.

After all of the coin pulses have been transmitted, the microprocessor will re-enable the microphone that was disconnected during the coin pulses routine.

Next, the microprocessor monitors the VOLUME SWitch input to see if it has changed states. If it has, a status bit will be set which will invoke the Volume Changed routine.

The Chassis Present and Handset Present routines are invoked next to send information to the WESROC remote unit.

Lastly, this module monitors the DATA IN pin of the microprocessor. Normally, the microprocessor only sends data out. However when the chassis is run on a production automated tester, bi-directional communication occurs. This section looks for that communication. A logic low on this pin signals that inbound communication is requested. This will call the Receive Message routine.

Figure 10:
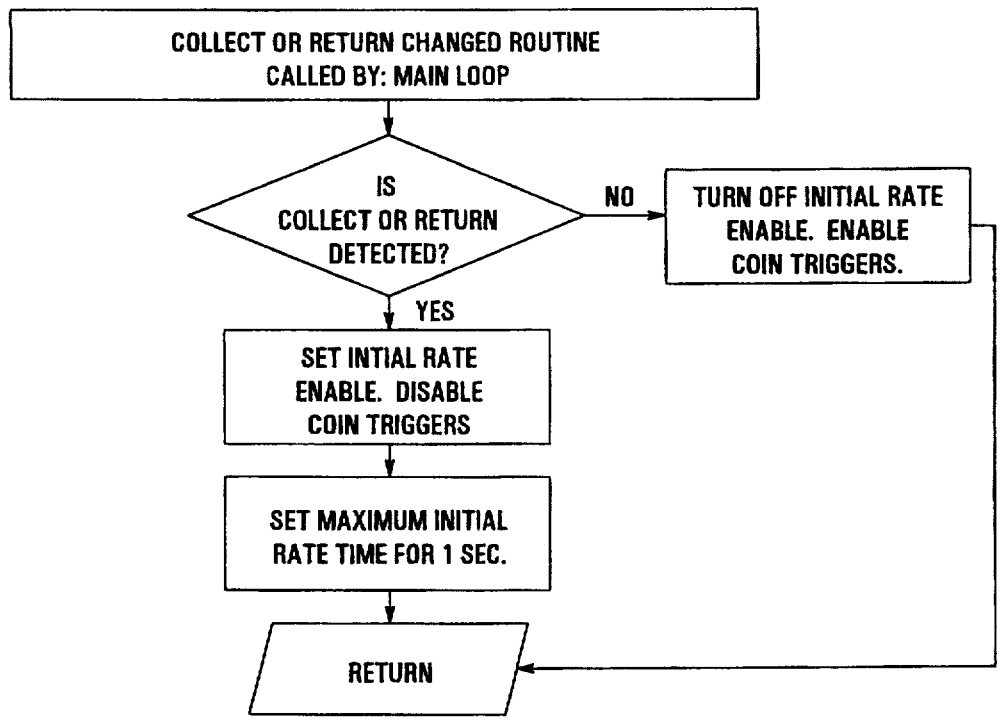
FIG. 10 is a flow diagram of the Collect and Return Changed routine in the chassis microprocessor software.

Referring to FIG. 10, the Collect or Return Changed routine module provides a built in redundancy to the collect/return portion of the hardware. The collect/return circuitry appears on FIGS. 5B and 5D. The Collect/Return voltage appears across TIP and Earth Ground on the chassis. This voltage will overcome CR36 or CR37, depending on the polarity of the signal. It will then go through the diode bridge CR40 and onto RELAY TIP. This will connect to the coin relay via P2 (FIG. 4B). The coin relay itself will complete the path to Earth Ground. When the voltage gets through CR40, it begins to activate K2 which will close the "switch" in K2 to bypass CR36 and CR37, thereby providing more voltage through CR40 and driving K2 harder to keep it activated. This provides a "self collapsing" circuit which requires a large activation voltage and a lower hold voltage. Shortly after K2 begins activating, ISO2 will activate as well. This will cause a logic low on the COLlect/RETurn DETECT input into microprocessor U10. When the microprocessor detects this it will disable the coin triggers by setting the COIN CLeaR line high. It will also set the ENAble INITIAL RATE line high, which will activate K1, and set the initial rate timer to 1 second. The "switch" in K1 will close, so during a collect or a return both K1 and K2 will be closed. When the collect or return is no longer detected, the coin triggers are re-enabled by setting the COIN CLeaR line low and setting the ENAble INITIAL RATE line low.

Figure 11:
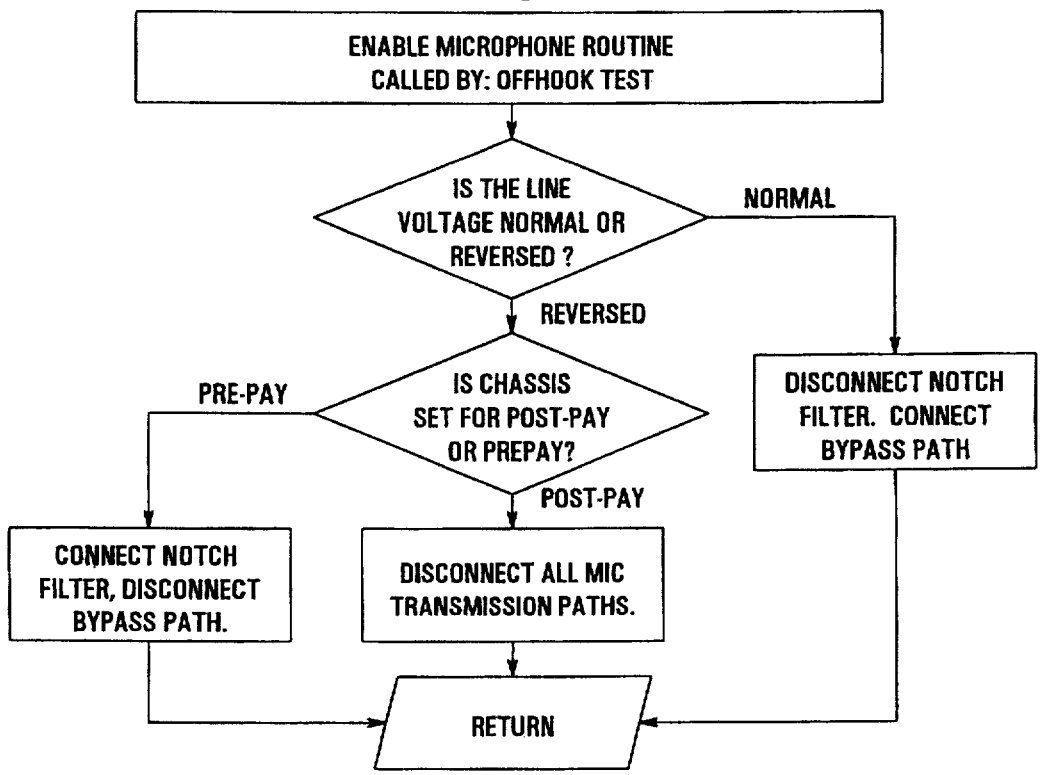
FIG. 11 is a flow diagram of the Enable Microphone routine in the chassis microprocessor software.

Referring to FIG. 11, the Enable Microphone routine re-enables the microphone that was disconnected during the transmission of coin tones. How the microphone is enabled depends on the line polarity and if the chassis is in pre-pay or post-pay mode. In pre-pay mode money must be deposited prior to making a phone call. In post-pay mode money is not deposited until after the called party answers, similar to a long distance call. Which mode is determined by the POSTPAY line from initial rate switches S2 (FIG. 7B). A high means pre-pay, a low means post-pay. If the line is normal polarity (logic high on LINE NORMAL input (FIG. 5C)), the microphone is returned to normal, regardless of what mode the chassis is in, by setting 2200 NOTCH low and 2200 BYPASS high. If the line is reverse polarity and in pre-pay mode, the microphone path goes through the notch filter by setting 2200 NOTCH high and 2200 BYPASS low. If it is in post-pay mode all microphone transmission paths are opened be setting both 2200 NOTCH and 2200 BYPASS high.

Figure 12:
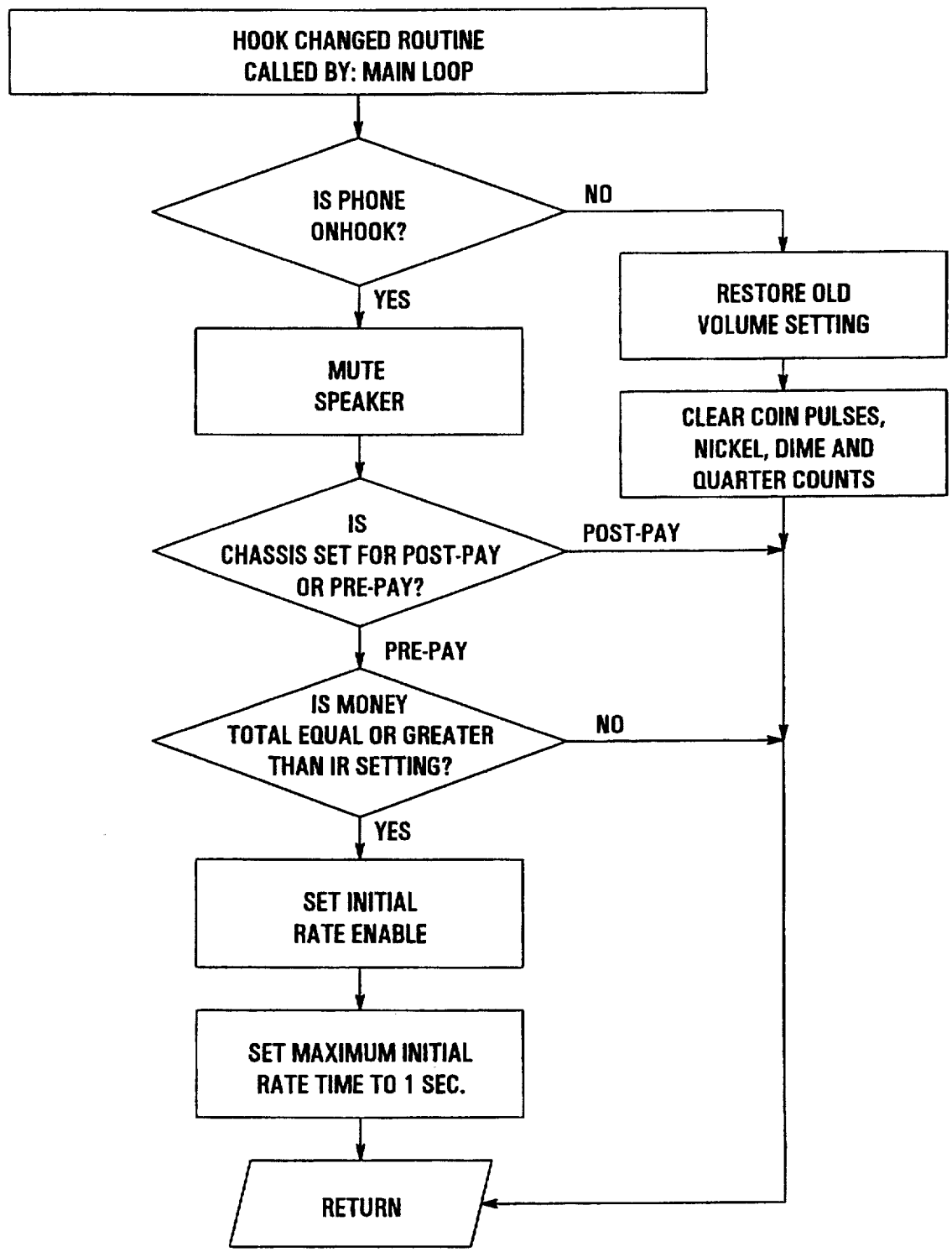
FIG. 12 is a flow diagram of the Hook Changed routine in the chassis microprocessor software.

Referring to FIG. 12, the Hook Changed routine module is responsible for asserting initial rate. When the central office does an initial rate check, the microprocessor will see it as an on-hook condition (logic high on the ON HOOK line).

If the phone has gone off-hook, the microprocessor restores the volume to the last user assessable volume level and clears out the coin count registers.

If the phone is on-hook, the microprocessor "hard" mutes the speaker (See Table 2 under Volume Changed routine) and checks to see if the chassis is in pre-pay or post-pay mode. If the chassis is in post-pay mode (logic high on POSTPAY line), the microprocessor will exit the routine without any further action since there is no initial rate check on a post-pay system. Otherwise the microprocessor will check to see if the total money deposited is greater than or equal to the initial rate setting.

The initial rate setting is determined by summing the 5 CENT, 10 CENT, 20 CENT, 40 CENT, and 80 CENT inputs from S2 (FIG. 7B) that are at a logic low. For example, to set the initial rate for $0.25, the 5 CENT and 20 CENT switches would be "on" and at a logic low. The chassis is capable of having initial rate settings from $0.05 to $1.55 in $0.05 increments. If enough money has been deposited, the microprocessor will set ENAble INITIAL RATE high and set the initial rate timer to 1 second. Otherwise it will exit the routine.

Figure 13:
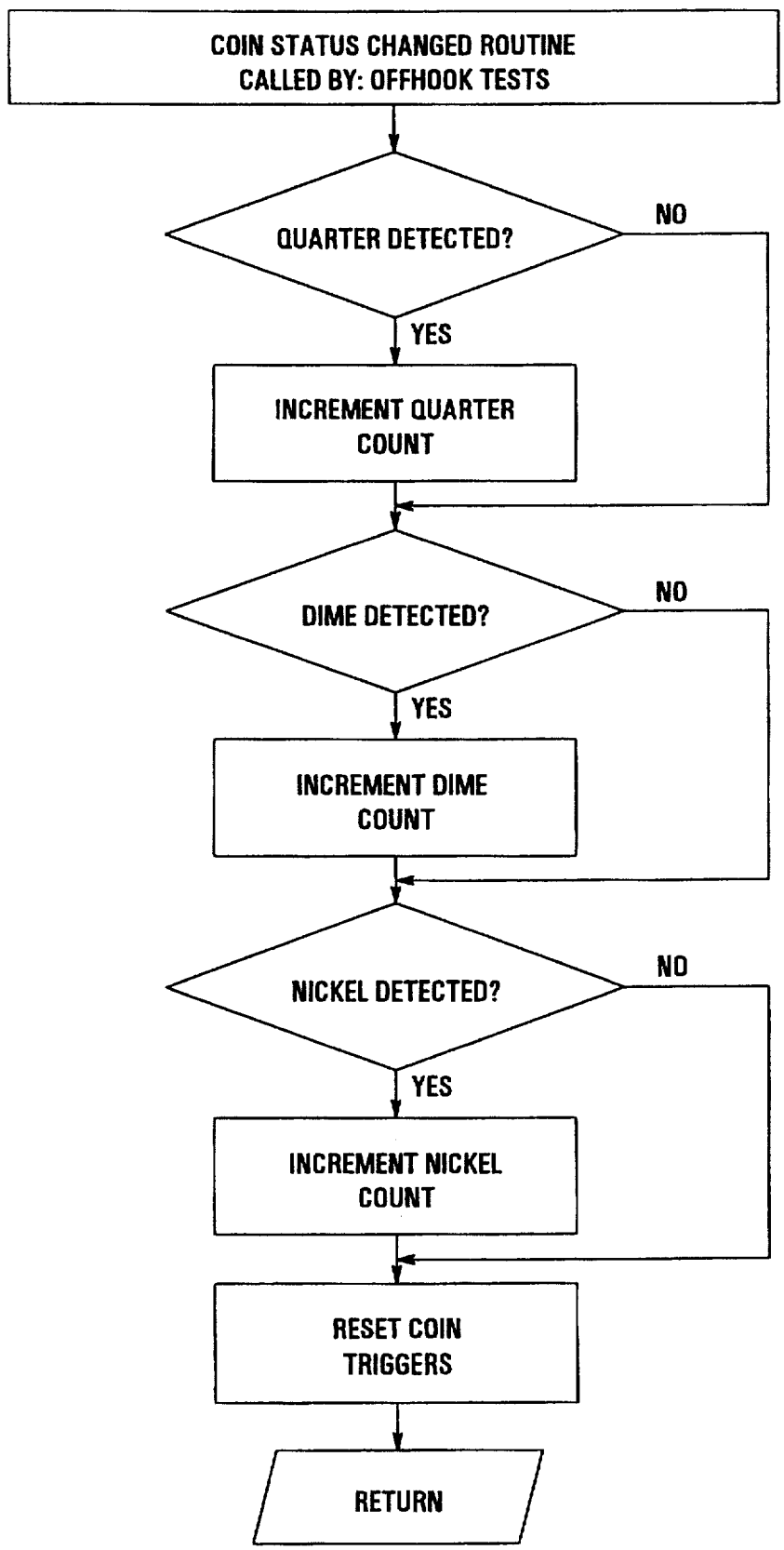
FIG. 13 is a flow diagram of the Coin Status Changed routine in the chassis microprocessor software.

Referring to FIG. 13, the Coin Status Changed routine will determine which coin(s) has(have) been deposited and increment the respective counter(s) for the coin(s). After all of the coins have been tabulated, the coin triggers will be reset. Only one coin of each denomination can be seen each time this module is invoked. This does not pose any difficulties due to the speed at which the microprocessor traverses the software. The coin counters give the microprocessor the ability to "store" coins. This is necessary since it will not transmit coin tones while a dial pad key is pressed but still can detect coins.

Figure 14:
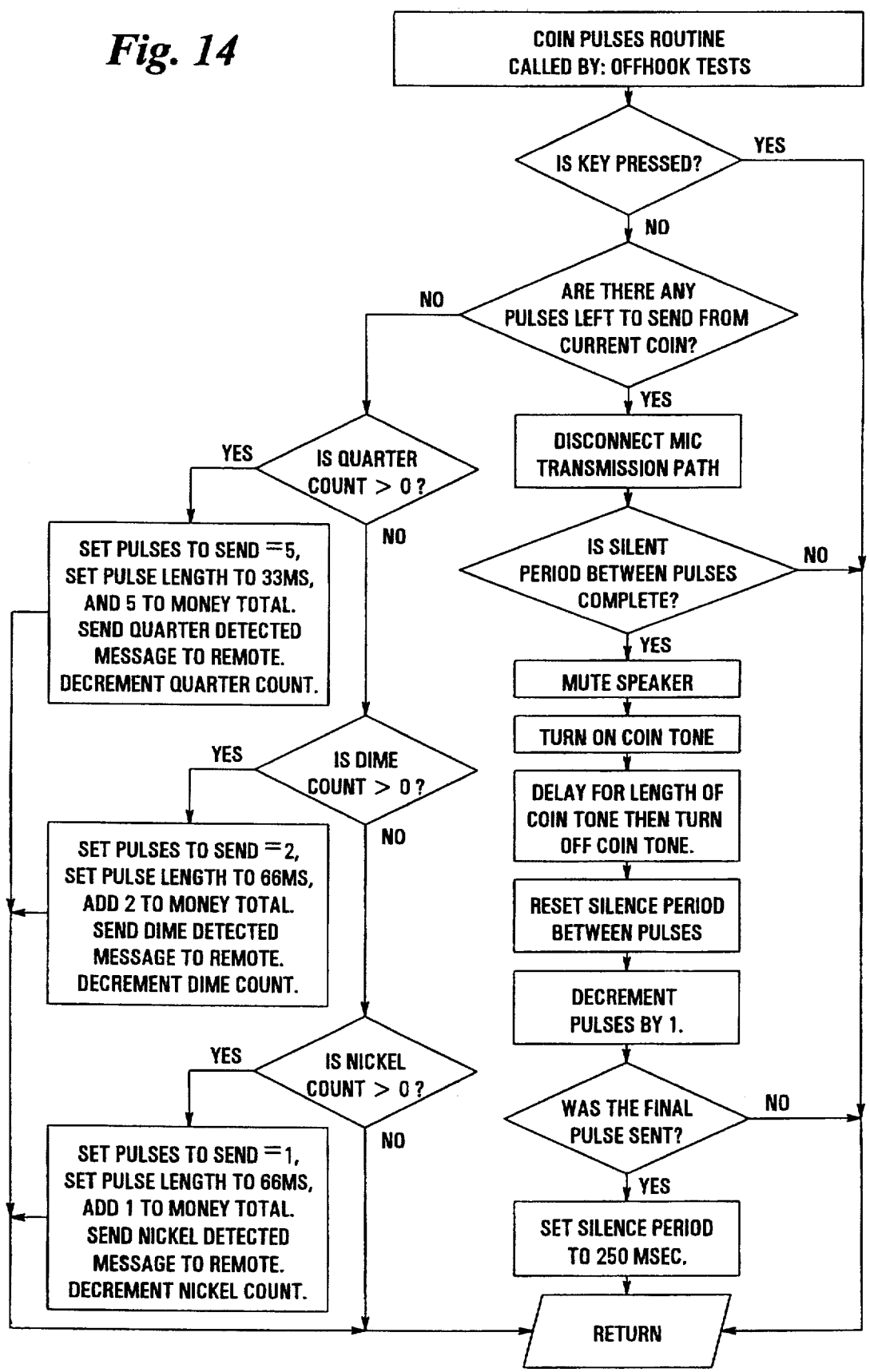
FIG. 14 is a flow diagram of the Coin Pulses routine in the chassis microprocessor software.

Referring to FIG. 14, the Coin Pulses routine module is responsible for transmitting coin tones and telling the WESROC remote unit which coin(s) it has seen. This module handles all aspects of coin tone transmission including the number of pulses to send, the coin tone period, and the silent period for each denomination of coin. All quarters will be transmitted first, then dimes, then nickels. The Coin Tone Period=The Silent Period=The Pulse Length of the coin. For a quarter the Pulse Length is 33 ms, for a nickel and dime the Pulse length is 66 ms. If there is more than one coin to transmit there is a 250 ms silent period between the coin tones. When the microprocessor determines which coin to transmit it tells the WESROC remote unit which coin it is and it decrements the counter for that coin. For example, if the chassis is going to send a quarter, it sets the number of pulses to 5, the pulse length to 33 ms, tells the remote that it saw a quarter and decreases the qtr cnt by 1.

The coin tone is transmitted by setting the SEND COIN ToNe line high. It is held high for the length of the coin tone period and then brought low again. After the coin tone pulse is completed, the microprocessor sets the silent period timer to the pulse length associated with the coin being sent.

This module transmits one pulse with each invocation. A quarter has five pulses so this module will have to be invoked at least five times to complete the coin tone associated with the quarter.

The microphone is "disconnected" from the phone line to prevent interference with the coin tones when they are being transmitted. This is accomplished by setting both 2200 NOTCH and 2200 BYPASS lines low. The speaker is "hard" muted to prevent the coin tones from being recorded by the user.

Figure 15:
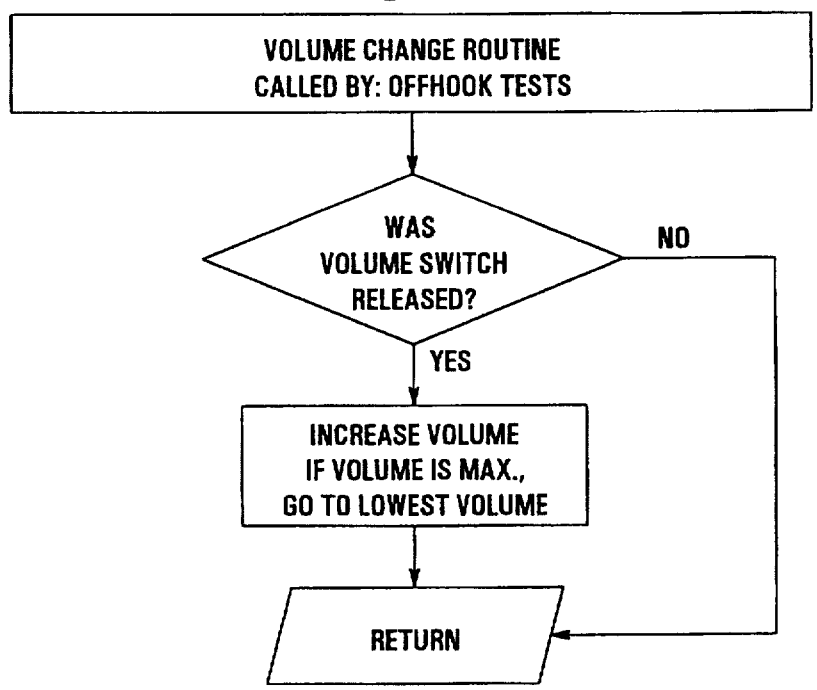
FIG. 15 is a flow diagram of the Volume Changed routine in the chassis microprocessor software.

Referring to FIG. 15, the Volume Changed routine module monitors the *VOLUME SWitch line of the microprocessor.

When the line goes low, the module is exited. When it goes high, the speaker volume level is increased to the next User volume level indicated in Table 2. If the current volume level is User 4, the volume level will go to User 1. The volume level is changed by setting a combination of GAIN 0, GAIN 1 and GAIN 2 high or low.

TABLE 2

| Volume Level | GAIN 0 | GAIN 1 | GAIN 2 |
|---|---|---|---|
| Hard Mute | LOW | LOW | LOW |
| Soft Mute | HIGH | LOW | LOW |
| User 1 | LOW | HIGH | LOW |
| User 2 | HIGH | HIGH | LOW |
| User 3 | LOW | LOW | HIGH |
| User 4 | HIGH | LOW | HIGH |

Hard Mute is used when coin tones are being transmitted and when an initial rate check is occurring. Soft Mute is used when a dial pad key is pressed.

Figure 16:
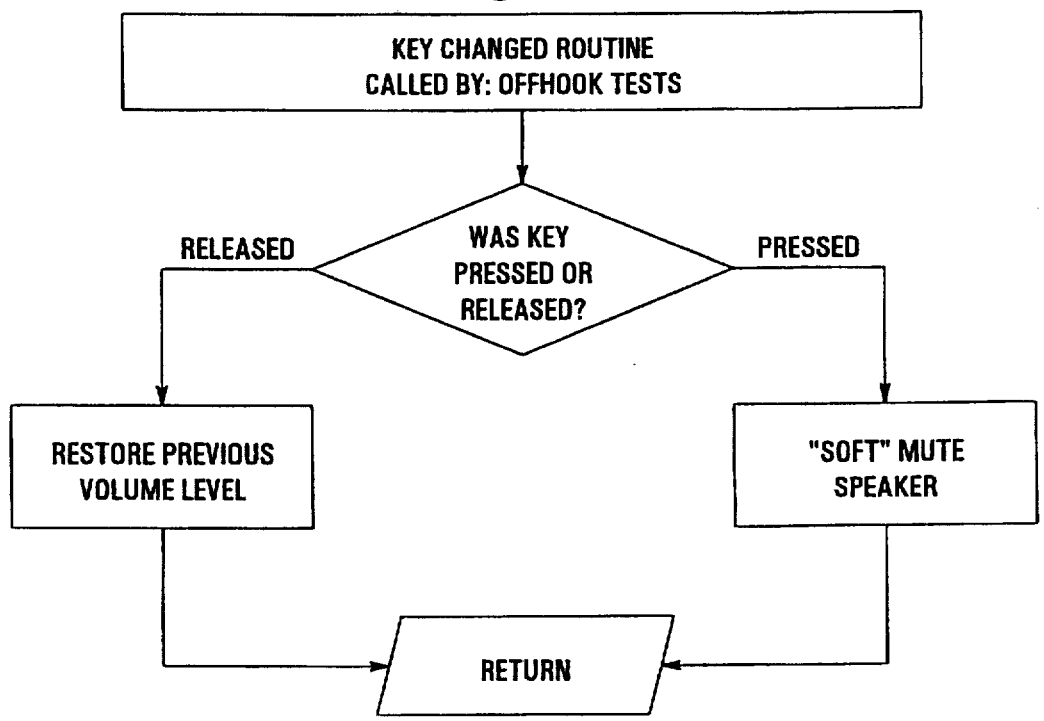
FIG. 16 is a flow diagram of the Key Changed routine in the chassis microprocessor software.

Referring to FIG. 16, the Key Changed routine module "soft" mutes the handset speaker when a dial pad key is pressed. The tones coming from the dial pad are fairly loud and could cause discomfort to the user. When the speaker is "soft" muted, the tones are still audible but are attenuated. When the key is released, the speaker volume is restored to the User level that it was at prior to the key being pressed. To detect this, the microprocessor monitors the KEY PRESS line.

Figure 17:
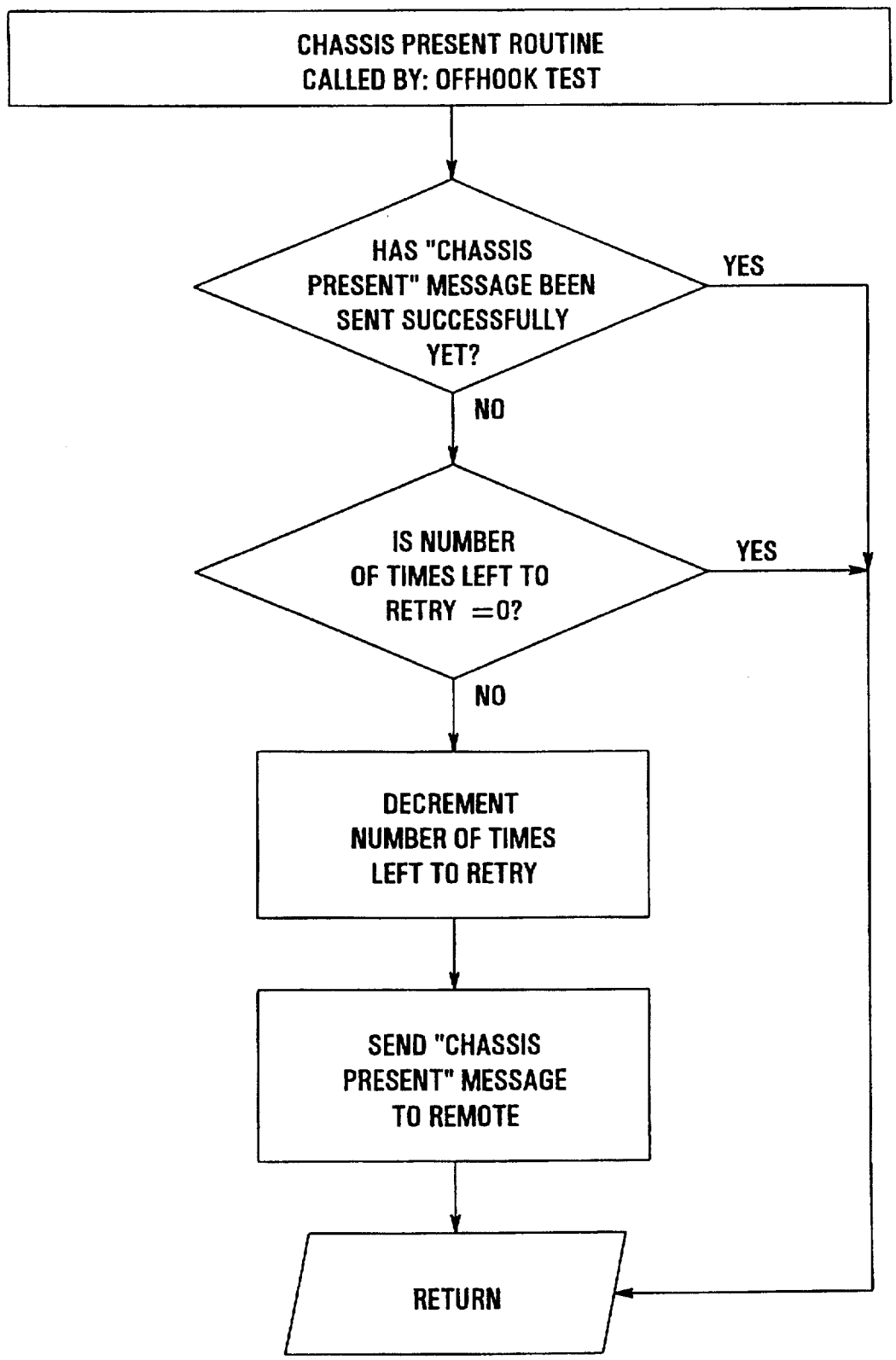
FIG. 17 is a flow diagram of the Chassis Present routine in the chassis microprocessor software.

Referring to FIG. 17, the Chassis Present routine module tells the WESROC remote unit that a coin telephone chassis is present. If the microprocessor has already successfully told the remote of its presence no further action is taken. The microprocessor will try to communicate with the remote unit three times. Communication is initiated by the microprocessor setting the DATA OUT line high. If a remote unit is connected to the Remote Interface (J2 on FIG. 4A), it will respond by "clocking" the DATA IN line of the microprocessor. During this clock sequence, the microprocessor will send the "chassis present" command on the DATA OUT line.

Figure 18:
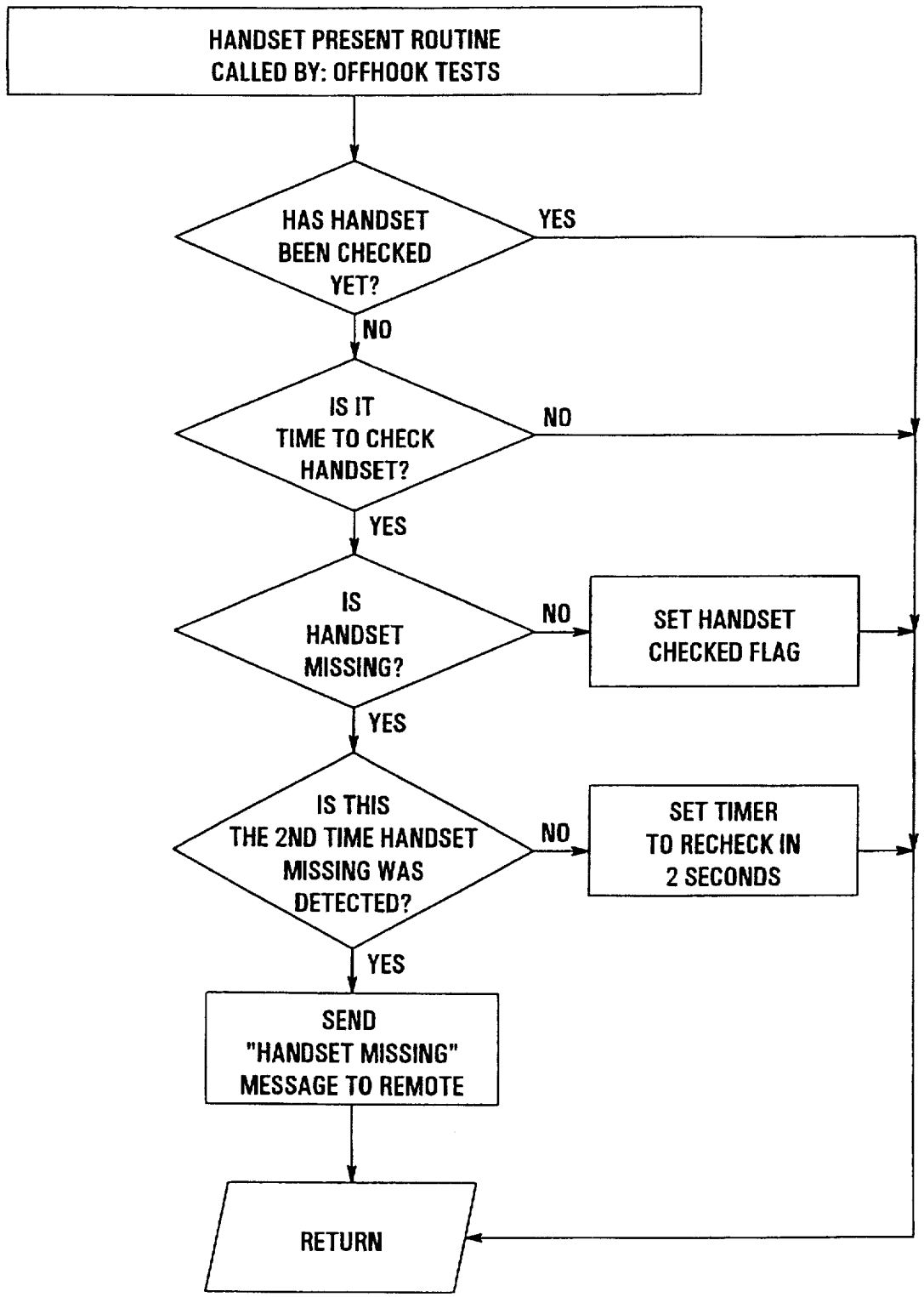
FIG. 18 is a flow diagram of the Handset Present routine in the chassis microprocessor software.

Referring to FIG. 18, the Handset Present routine module checks for the presence of the handset microphone. The microphone handset is powered and when it is present there will be current driving ISO3 (FIG. 5D). This will activate the output of ISO3 and bring HANDSET PRESent line low.

The microprocessor has a status bit telling if it has already checked for the handset, if it has already been checked it exits the module. If the handset has not been checked yet the microprocessor checks to see if it is time to check it. The first check occurs 2 seconds after an off-hook condition. If the first check finds the handset present, the Handset Checked Status Flag is set to True and the module exits. If the first check does not find the handset, it will prepare to do a second check in 2 seconds. If the second check finds the handset still missing it will send the "handset missing" message to the WESROC remote unit.

Figure 19:
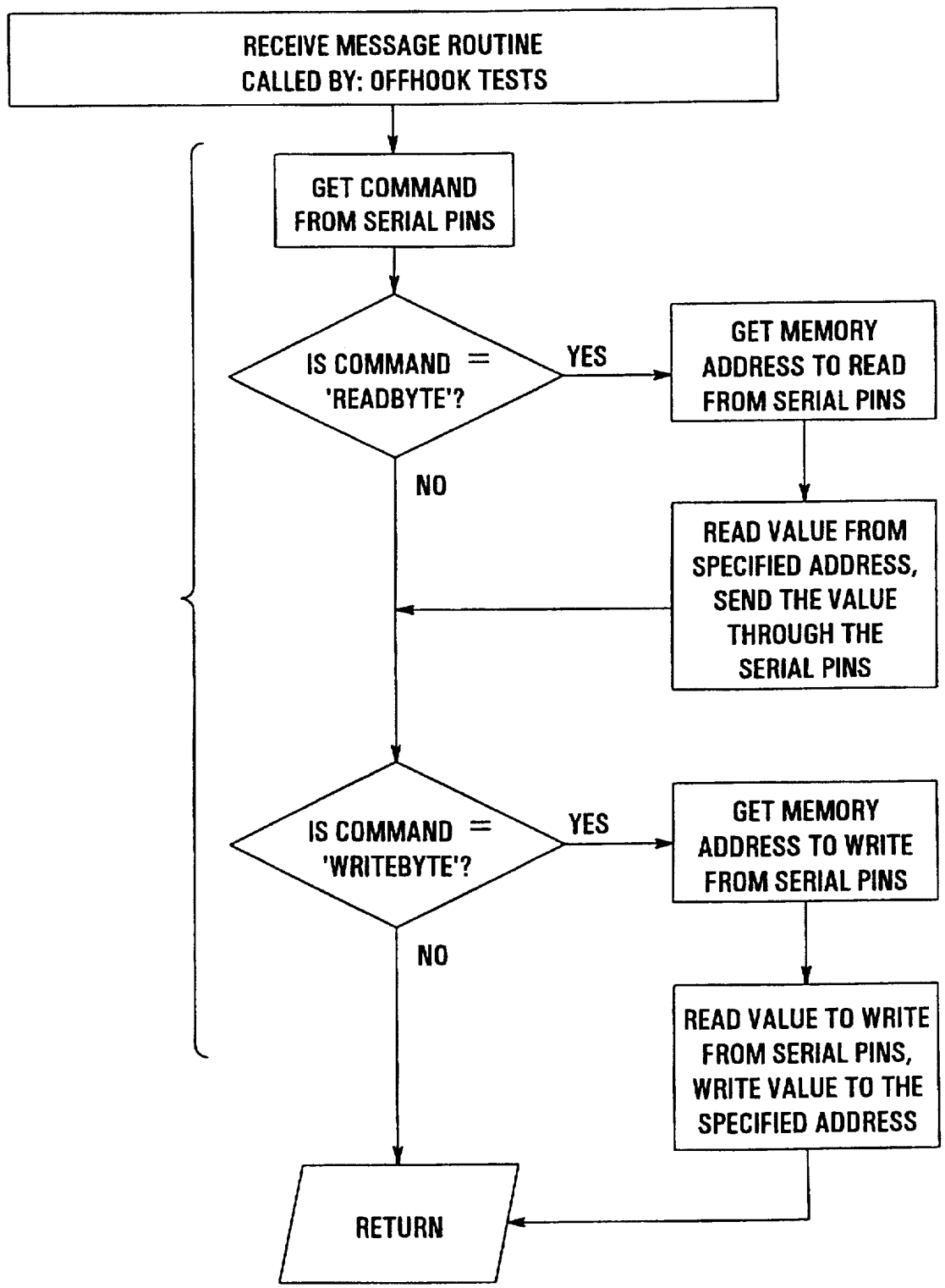
FIG. 19 is a flow diagram of the Received Message routine in the chassis microprocessor software.

Referring to FIG. 19, the Receive Message routine module is used in the automated production testing of the chassis. It gives the chassis manufacturer the capability to set or read any and all ports of the microprocessor.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A chassis for a telephone-line powered coin telephone, said telephone being owned by a telephone company and connected to a telephone system which provides loop current from a central office through tip and ring conductors of a telephone line connected to said chassis and through said chassis in response to an off-hook condition at said telephone being sensed by said central office, comprising:

(a) electronic circuitry which operates using said loop current to control the operation and functions of said telephone while said telephone is in an off-hook condition, said electronic circuitry operating properly on as little as 23 milliamperes of said loop current without turning off any portions of the circuitry, said electronic circuitry shutting down when said telephone is in an on-hook condition,
 (i) a portion of said electronic circuitry detecting whether or not a handset is connected to said telephone by detecting a current flowing through a carbon microphone in said handset,
 (ii) a portion of said electronic circuitry providing tone fraud protection,
 (iii) a portion of said electronic circuitry providing pin fraud protection using an isolated power supply, said isolated power supply providing a DC bias current for a carbon microphone in a handset and preventing tip to ground current from flowing if said handset is shorted to ground,
 (iv) a portion of said electronic circuitry providing a push-button line diagnostic test for determining polarity and ground conditions of said telephone line to verify correct installation of the chassis to said telephone line,
 (v) a portion of said electronic circuitry providing volume control and further providing an interface for a volume switch,
 (vi) a portion of said electronic circuitry having an interface for an electronic coin chute,
 (vii) a portion of said electronic circuitry making a direct serial communications link with a remote unit of a coin telephone monitoring system, and
 (viii) a portion of said electronic circuitry providing DTMF priority, (b) a microprocessor which receives input signals from portions of said electronic circuitry and provides outputs to portions of said electronic circuitry;

(c) a plurality of capacitors for storing necessary energy and providing necessary voltage to keep said microprocessor powered during coin control operation immediately following a phone call when said loop current is not available, said capacitors keeping said microprocessor powered for up to 10 seconds;

(d) a voltage detector which shuts down said microprocessor when said voltage from said capacitors drops below 2.7 Volts; and (e) means to electrically connect said electronic circuitry to said telephone.

* * * * *